US012764618B2

(12) United States Patent
Da Silva et al.

(10) Patent No.: US 12,764,618 B2
(45) Date of Patent: Oct. 13, 2026

(54) CONFIGURING A WIRELESS DEVICE CONFIGURED WITH MULTI-RADIO ACCESS TECHNOLOGY DUAL CONNECTIVITY

(71) Applicant: Telefonaktiebolaget LM Ericsson (publ), Stockholm (SE)

(72) Inventors: Icaro Leonardo Da Silva, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 841 days.

(21) Appl. No.: 18/019,509

(22) PCT Filed: Jul. 9, 2021

(86) PCT No.: PCT/SE2021/050718
§ 371 (c)(1),
(2) Date: Feb. 3, 2023

(87) PCT Pub. No.: WO2022/031203
PCT Pub. Date: Feb. 10, 2022

(65) Prior Publication Data

US 2023/0292194 A1 Sep. 14, 2023

Related U.S. Application Data

(60) Provisional application No. 63/061,964, filed on Aug. 6, 2020.

(51) Int. Cl.
*H04W 36/00* (2009.01)
*H04W 52/02* (2009.01)

(52) U.S. Cl.
CPC . *H04W 36/00698* (2023.05); *H04W 36/0072* (2013.01); *H04W 52/0216* (2013.01)

(58) Field of Classification Search
CPC ....... H04W 36/00698; H04W 36/0072; H04W 52/0216; H04W 76/16; H04W 76/27;
(Continued)

(56) References Cited

U.S. PATENT DOCUMENTS 11,284,343 B2 * 3/2022 Zhang .................. H04W 76/27
11,363,656 B2 * 6/2022 Adusumilli ........... H04W 24/10
(Continued)

FOREIGN PATENT DOCUMENTS

CN 105940651 A 9/2016
CN 110999519 A 4/2020
(Continued)

OTHER PUBLICATIONS

3GPP TSG-RAN WG2 Meeting #85 MCG handover for dual connectivity R2-140531 Prague, Czech Republic, Feb. 10-14, 2014 (Year: 2014).*

(Continued)

*Primary Examiner* — Nizar N Sivji
(74) *Attorney, Agent, or Firm* — Murphy, Bilak & Homiller, PLLC

(57) ABSTRACT

Methods and apparatus are disclosed, including in an example a method performed by a wireless device configured with Multi-Radio Access Technology Dual Connectivity (MR-DC). The method comprises receiving, from a first network node, at least one message in a reconfiguration procedure for a first cell group. The at least one message indicates a mode of operation of the wireless device for a second cell group by the wireless device.

26 Claims, 20 Drawing Sheets

(58) Field of Classification Search
CPC . H04W 76/28; H04W 76/19; H04W 36/0069; H04W 76/15; Y02D 30/70
See application file for complete search history.

(56) References Cited

U.S. PATENT DOCUMENTS

| | | | | |
|---|---|---|---|---|
| 12,369,213 | B2 * | 7/2025 | Orsino | H04W 76/14 |
| 12,396,051 | B2 * | 8/2025 | Kim | H04W 36/0079 |
| 2016/0044744 | A1 | 2/2016 | Lee et al. | |
| 2016/0308653 | A1 | 10/2016 | Dinan | |
| 2019/0215899 | A1 | 7/2019 | Ma et al. | |
| 2019/0254110 | A1 | 8/2019 | He et al. | |
| 2020/0037248 | A1 | 1/2020 | Zhou et al. | |
| 2020/0323033 | A1 * | 10/2020 | Hwang | H04W 76/16 |
| 2020/0351725 | A1 * | 11/2020 | Kim | H04W 80/02 |
| 2020/0359441 | A1 * | 11/2020 | Yilmaz | H04W 76/15 |
| 2020/0374961 | A1 * | 11/2020 | Ingale | H04W 76/20 |
| 2021/0022053 | A1 * | 1/2021 | Cirik | H04B 7/06964 |
| 2021/0051767 | A1 * | 2/2021 | Zhang | H04W 88/02 |
| 2021/0243763 | A1 * | 8/2021 | Zhou | H04W 72/23 |
| 2022/0394584 | A1 * | 12/2022 | Ishii | H04W 76/19 |
| 2023/0388871 | A1 * | 11/2023 | Guo | H04W 36/0069 |
| 2024/0031844 | A1 * | 1/2024 | Jeong | H04W 36/249 |

FOREIGN PATENT DOCUMENTS

| | | | | |
|---|---|---|---|---|
| CN | 111345110 | A | 6/2020 | |
| CO | 2020011942 | A2 | 11/2020 | |
| EP | 3439374 | A1 | 2/2019 | |
| EP | 3606223 | A1 * | 2/2020 | H04W 76/36 |
| WO | WO-2019031948 | A1 * | 2/2019 | H04W 80/02 |
| WO | 2020032854 | A1 | 2/2020 | |
| WO | 2020065622 | A1 | 4/2020 | |
| WO | 2020091546 | A1 | 5/2020 | |
| WO | 2020146499 | A1 | 7/2020 | |

OTHER PUBLICATIONS

Mediatek Inc. (Rapporteur), "[Post109e#43][PowSav] UE Assistance and RRC open issues", 3GPP TSG-RAN WG2 Meeting #109bis, R2-200xxxx, Online, April 202, 1-20.

Qualcomm Inc, "[AT109e][505][Pow] Email discussion on open issues on UE assistance", 3GPP TSG-RAN WG2 Meeting #109 electronic, R2-2001914, Elbonia, Feb 24-Mar. 6, 2020, 1-24.

3GPP, "3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Jul. 2020, 1-390.

3GPP, "3GPP TS 36.331 V16.2.0", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1081.

3GPP, "3GPP TS 38.331 V16.1.0", 3rd Generation Partnership Project; Technical Specification Group Radio Access Network; NR; Radio Resource Control (RRC) protocol specification (Release 16), Jul. 2020, 1-906.

3GPP, "3GPP TS 36.300 V16.5.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Mar. 2021, 1-391.

3GPP, "3GPP TS 37.340 V16.2.0", 3rd Generation Partnership Project; Technical Specification Group Radio Access Network; Evolved Universal Terrestrial Radio Access (E-UTRA) and NR; Multi-connectivity; Stage 2 (Release 16), Jul. 2020, 1-78.

3GPP, "3GPP TS 37.340 V16.5.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2021, 1-84.

Apple, "Summary of Offline—007: DC Configuration (Apple)", 3GPP TSG-RAN WG2 Meeting #110, R2-2006186, Electronic, Jun. 1-Jun. 12, 2020, 1-17.

China Telecom, "Views on NR Rel-17", 3GPP TSG RAN Meeting #84, RP-190919, Newport Beach, USA, Jun. 4, 2019, 1-36.

ETSI MCC, "Report of 3GPP TSG RAN2#107bis meeting, Chongqing, China", 3GPP TSG-RAN WG2 meeting #108, R2-1914301, Oct. 14-18, 2019, 1-283.

Mediatek Inc., "Summary of [Post109bis-e][939][PowSav] RRC open issues (Mediatek)", 3GPP TSG-RAN WG2 Meeting #110e, R2-2004945, Online, Jun. 1-12, 2020, 1-33.

Qualcomm Incorporated, "Introducing suspension of SCG", 3GPP TSG RAN WG2 Meeting #107, R2-1908679, Prague, Czech, Aug. 26-30, 2019, 1-4.

Broadcom Corporation, "MCG handover for Dual Connectivity". 3GPP TSG-RAN WG2 Meeting #85, R2-140531, Prague, Czech Republic, Feb. 10-14, 2014.

CATT, "Direct SCell activation in CA or DC Scenarios". 3GPP TSG-RAN WG2 Meeting #107, R2-1908899, Prague, Czech Republic, Aug. 26-30, 2019.

3GGP, "3rd Generation Partnership Project; Technical Specification Group Radio Access Network; NR; NR and NG-RAN Overall Description; Stage 2 (Release 15)", 3GPP TS 38.300 V15.7.0, Sep. 2019, 99 pages.

"Dormant SCG state", 3GPP TSG-RAN WG2 Meeting 107bis, R2-1912118, Chongqing, P.R.China, Oct. 14-18, 2019, 1-4.

"Further discussion on suspension of SCG", 3GPP TSG RAN WG2 Meeting #108, R2-1914364, Reno, Nevada, US, Nov. 18-22, 2019, 1-10.

3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.7.0, Sep. 2019, 1-70.

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 1-527.

Intel Corporation, "Practical scoping of SCG suspension operation in NR", 3GPP TSG RAN WG2 Meeting #108, R2-1914576, Reno, USA, Nov. 18-22, 2019, 1-6.

Interdigital (Rapporteur), "Report on email discussion on [107#32][NR/DCCA] MCG SCell/SCG Resume", 3GPP TSG-RAN WG2#107bis, R2-1912880, Chongqing, China, Oct. 14-18, 2019, 1-43.

Mediatek Inc., "Discussion on Suspended SCG", 3GPP TSG-RAN WG2 #108, R2-1914951, Reno, Nevada, USA, Nov. 18-22, 2019, 1-3.

ZTE Corporation, "Consideration on SN lower layer suspense", 3GPP TSG-RAN WG3 #106, R3-196631, Reno, NV, USA, Nov. 18-22, 2019, 1-2.

ZTE Corporation, et al., "On SCG Suspension", 3GPP TSG-RAN WG2 Meeting #107bis, R2-1913491, Chongqing, China, Sep. 14-18, 2019, 1-8.

"Direct SCell activation in CA or DC Scenarios", 3GPP TSG-RAN WG2 Meeting #107, R2-1908899, Prague, Czech Republic, Aug. 26-30, 2019, pp. 1-3.

* cited by examiner

1000

1100

CONFIGURING A WIRELESS DEVICE CONFIGURED WITH MULTI-RADIO ACCESS TECHNOLOGY DUAL CONNECTIVITY

TECHNICAL FIELD

Examples of this disclosure relate to configuring a wireless device configured with Multi-Radio Access Technology Dual Connectivity (MR-DC).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Multi-Radio Access Technology Dual Connectivity (MR-DC) is a generalization of the Intra-E-UTRA Dual Connectivity (DC) as described in TS 36.300 V16.5.0 (which is incorporated herein by reference), where a multiple Rx/Tx capable UE may be configured to use resources provided by two different nodes connected via non-ideal backhaul, one providing NR access and the other one providing either E-UTRA or NR (New Radio) access. One node acts as the Master Node (MN) and the other as the Secondary Node (SN). The MN and SN are connected via a network interface and at least the MN is connected to the core network.

When configured with MR-DC, the UE typically operates initially a serving cell group called a master cell group (MCG). The UE is then configured by the network with an additional cell group called a secondary cell group (SCG). Each cell group (CG) can have one or more serving cells. The MCG and SCG can be operated from geographically non-collocated gNBs. The MCG and SCG can be operated with corresponding serving cells belonging to different frequency ranges and/or corresponding serving cells in same and different frequency ranges. In an example, a MCG can have serving cells in Frequency Range 1 (FR1), and SCG can also have serving cells in FR1.

There are different ways to deploy 5G networks with or without interworking with LTE (also referred to as E-UTRA) and evolved packet core (EPC). In principle, NR and LTE can be deployed without any interworking, denoted by NR stand-alone (SA) operation. That is, gNB in NR can be connected to 5G core network (5GC) and eNB can be connected to EPC with no interconnection between the two (Option 1 and Option 2). On the other hand, the first supported version of NR is the so-called EN-DC (E-UTRAN-NR Dual Connectivity), illustrated by Option 3. In such a deployment, dual connectivity between NR and LTE is applied with LTE as the master and NR as the secondary node. The RAN node (gNB) supporting NR may not have a control plane connection to core network (EPC). Instead it may rely on the LTE as master node (MeNB). This is also called as "Non-standalone NR". In this case, the functionality of an NR cell is limited and would be used for connected mode UEs as a booster and/or diversity leg, but an RRC_IDLE UE cannot camp on these NR cells.

As migration for these options may differ from different operators, it is possible to have deployments with multiple options in parallel in the same network. For example, there could be an eNB base station supporting options 3, 5 and 7 in the same network as a NR base station supporting options 2 and 4. In combination with dual connectivity solutions between LTE and NR it is also possible to support CA (Carrier Aggregation) in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC or both EPC/5GC.

In TS 37.340 V16.5.0 (which is incorporated herein by reference), the procedures for MR-DC are classified as follows:

MR-DC with EPC (also called EN-DC)

MR-DC with 5GC

MR-DC with EPC (EN-DC)

E-UTRAN supports MR-DC via E-UTRA-NR Dual Connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface. An example of the EN-DC architecture is illustrated in FIG. 1.

MR-DC with 5GC

In E-UTRA-NR Dual Connectivity, NG-RAN supports NG-RAN E-UTRA-NR Dual Connectivity (NGEN-DC), in which a UE is connected to one ng-eNB that acts as a MN (master node) and one gNB that acts as a SN (secondary node).

In NR-E-UTRA Dual Connectivity, NG-RAN supports NR-E-UTRA Dual Connectivity (NE-DC), in which a UE is connected to one gNB that acts as a MN and one ng-eNB that acts as a SN.

In NR-NR Dual Connectivity, NG-RAN supports NR-NR Dual Connectivity (NR-DC), in which a UE is connected to one gNB that acts as a MN and another gNB that acts as a SN. In addition, NR-DC can also be used when a UE is connected to two gNB-DUs, one serving the MCG and the other serving the SCG, connected to the same gNB-CU, acting both as a MN and as a SN.

MR-DC User Plane Architecture

From a UE point of view, there are three Data Radio Bearer (DRB) types in MR-DC: MCG, SCG and split DRB, characterized by which cell group that is used for transmission. MCG DRB uses only the MCG, SCG DRB uses only the SCG, whereas split DRB can use both MCG and SCG for data transmission. For RLC/MAC, the protocol version (E-UTRA or NR) is selected based on the RAT used by the cell group. NR PDCP is used for all DRB types, except in EN-DC it is also possible for network to configure E-UTRA PDCP for MCG DRB.

From a network point of view, each DRB may be terminated either by the MN or the SN. This applies to all three bearer types, so that from a network point of view, six different bearer configurations are possible, see for example FIG. 2, which shows Radio Bearer types in MR-DC, and FIG. 3, which shows network side protocol termination options for MCG, SCG and split bearers in MR-DC with EPC (EN-DC). For bearer types requiring data transmission over X2/Xn interface, a flow control protocol is used between MN and SN to avoid excessive buffering of data on RLC bearer level, which may lead to excessive reordering at the receiving PDCP entity. The RLC bearer contains the RLC/MAC configuration for each logical channel towards the UE.

For DL transmission on split DRBs, the network decides per PDCP PDU whether to transmit via MCG or SCG. For UL transmission on split DRBs, the UE is configured with a buffer threshold. When data in buffer for the corresponding DRB is below the threshold, Buffer Status Reports (BSR) are sent only on the preferred path. The preferred path can be either MCG or SCG, and is configured by the network per DRB. When data in the buffer is above the buffer threshold, the UE reports the total BSR to both MCG and SCG. It is then up to the network scheduler using scheduling grants in MCG and SCG to control the uplink data flow.

FIG. 4 shows the network side radio protocol termination options for MCG, SCG and split bearers in the MN and SN for MR-DC with 5GC.

MR-DC Control Plane Architecture

A UE in MR-DC has a single control plane connection to the core network and a single RRC state, controlled by the MN. Both MN and SN has its own RRC entity for creating RRC messages or Information Elements (IE) for configuring the UE, see FIG. 5A, which shows control plane architecture for EN-DC and FIG. 5B, which shows control plane architecture for MR-DC with 5GC. Since the SN is responsible for its own resources, it provides the UE with the Secondary Cell Group (SCG) configuration in an RRC message and also the radio bearer configuration in an IE, for all bearers that are terminated in the SN. The MN in turn creates the Master Cell Group (MCG) configuration and the radio bearer configuration for all bearers terminated in the MN. The cell group configuration includes the configuration of L1 (physical layer), MAC and RLC. The radio bearer configuration includes the configuration of PDCP (and SDAP in case of 5GC).

The MN always sends the initial SN RRC configuration via MCG SRB (SRB1), but subsequent RRC configurations created by the SN can be sent to the UE either via the MN using SRB1 or directly to the UE using SRB3 (if configured). See FIG. 6 for network side protocol termination options for SRBs in MR-DC. For the SRB1 case, the MN receives from the SN an RRC message containing the SCG configuration and an IE containing the radio bearer configuration. The MN encapsulates these into the RRC message it creates itself, that may also include changes to the MCG configuration and radio bearer configuration of bearers terminated in the MN. Thereby, the MCG and SCG configurations may be sent to the UE in the same RRC message.

Split SRB1 is used to create diversity. From RRC point of view, it operates like normal SRB1. However, on PDCP level, the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg", "path" and "RLC bearer" are used interchangeably throughout this disclosure.

For the SRB3 case, the SN creates the RRC message including the SCG configuration and radio bearer configuration for radio bearers terminated in the SN. SN may only use SRB3 for reconfigurations not requiring coordination with MN.

SCG Mobility (Inter-SN/Inter-SN)

The following procedures described in TS 37.340 are relevant for this disclosure:

- Secondary Node Modification (MN/SN initiated);
- Secondary Node Release (MN/SN initiated);
- Secondary Node Change (MN/SN initiated);

Each of these could be described for MR-DC with the EPC (EN-DC) and MR-DC with the 5GC, but for the sake of brevity only the MR-DC with the 5GC cases are illustrated herein.

Inter-Master Node Handover with/without Secondary Node Change

Inter-MN handover with/without MN initiated SN change is used to transfer UE context data from a source MN to a target MN while the UE context at the SN is kept or moved to another SN. During an Inter-Master Node handover, the target MN decides whether to keep or change the SN (or release the SN, as described in clause 10.8 of TS 37.340). Only intra-RAT Inter-Master node handover with/without SN change is supported (e.g. no transition from NGEN-DC to NR-DC). In this case the UE is in MR-DC and receives a command for MCG mobility, and after that, it remains in MR-DC. FIG. 7 shows an example signalling flow for inter-MN handover with or without MN initiated SN change.

Master Node to eNB/gNB Change

The MN to ng-eNB/gNB Change procedure is used to transfer UE context data from a source MN/SN to a target ng-eNB/gNB. Both the cases where the source MN and the target node belong to the same RAT (i.e. they are both ng-eNBs or both gNBs) and the cases where the source MN and the target node belong to different RATs are supported. In this case the UE is in MR-DC and receives a command for MCG mobility, and after that, it leaves MR-DC (i.e. it releases the SCG upon the MCG reconfiguration with sync). FIG. 8 shows an example signalling flow for MN to ng-eNB/gNB change.

eNB/gNB to Master Node Change

The ng-eNB/gNB to MN change procedure is used to transfer UE context data from a source ng-eNB/gNB to a target MN that adds an SN during the handover. Only the cases where the source node and the target MN belong to the same RAT (i.e. they are both ng-eNBs or both gNBs) are supported. FIG. 9 shows an example signalling flow for ng-eNB/gNB to MN change.

SCG Power Saving Mode

In order to improve network energy efficiency and UE battery life for UEs in MR-DC, a Rel-17 work item planned to introduce efficient SCG/SCell activation/deactivation. This can be especially important for MR-DC configurations with NR SCG, as it has been evaluated in RP-190919 that in some cases NR UE power consumption is 3 to 4 times higher than LTE. 3GPP has specified the concepts of dormant SCell (in LTE) and dormancy like behavior of an SCell (for NR).

In LTE, when an SCell is in dormant state, like in the deactivated state, the UE does not need to monitor the corresponding PDCCH or PDSCH and cannot transmit in the corresponding uplink. However, differently from deactivated state, the UE is required to perform and report CQI measurements. A PUCCH SCell (SCell configured with PUCCH) cannot be in dormant state.

In NR, dormancy like behaviour for SCells is realized using the concept of dormant BWPs. One dormant BWP, which is one of the dedicated BWPs configured by the network via RRC signaling, can be configured for an SCell. If the active BWP of the activated SCell is a dormant BWP, the UE stops monitoring PDCCH on the SCell but continues performing CSI measurements, AGC and beam management, if configured. A DCI is used to control entering/leaving the dormant BWP for one or more SCell(s) or one or more SCell group(s), and it is sent to the special cell (sPCell) of the cell group that the SCell belongs to (i.e. PCell in case the SCell belongs to the MCG and PSCell if the SCell belongs to the SCG). The SpCell (i.e. PCell of PSCell) and PUCCH SCell cannot be configured with a dormant BWP.

However, only SCells can be put to put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution could be releasing (for power savings) and adding (when traffic demands requires) the SCG on a need basis. However, traffic is likely to be bursty, and adding and releasing the SCG involves a significant amount of RRC signaling and inter-node messaging between the MN and the SN, which causes considerable delay.

In rel-16, some discussions were made regarding putting also the PSCell in dormancy, also referred to as SCG Suspension. Some preliminary agreements were made in RAN2-107bis, October 2019 (see chairman notes at R2-1914301):

R2 assumes the following (can be slightly modified due to progress on Scell dormancy):
- The UE supports network-controlled suspension of the SCG in RRC_CONNECTED.
- UE behavior for a suspended SCG is FFS
- The UE supports at most one SCG configuration, suspended or not suspended, in Rel16.
- In RRC_CONNECTED upon addition of the SCG, the SCG can be either suspended or not suspended by configuration.

In RAN-2 108, further discussion was made to clarify the above FFSs.

Some solutions have been proposed in Rel-16, but these have different problems. For example, in R2-1908679 (Introducing suspension of SCG—Qualcomm), the paper proposes that gNB can indicate UE to suspend SCG transmissions when no data traffic is expected to be sent in SCG so that UE keeps the SCG configuration but does not use it for power saving purpose. Therein, it is mentioned that signaling to suspend SCG could be based on DCI/MAC-CE/RRC signaling, but no details were provided regarding the configuration from the gNB to the UE. And, differently from the defined behavior for SCell(s), PSCell may be associated to a different network node (e.g. a gNodeB operating as Secondary Node).

It is yet to be seen which behavior will be specified for SCG power saving in rel-17. However, it is very likely that is going to be one or more of the following:
- The UE starting to operate the PSCell in dormancy, e.g. switching the PSCell to a dormant BWP. On the network side, the network considers the PSCell in dormancy and at least stops transmitting PDCCH for that UE in the PSCell and SCells;
- The UE deactivating the PSCell like SCell deactivation; On the network side, the network considers the PSCell as deactivated and at least stops transmitting PDCCH for that UE in the PSCell (and also on the SCells);
- The UE operating the PSCell in long DRX; SCG DRX can be switched off from the MN (e.g. via MCG RRC, MAC CE or DCI) when the need arises (e.g. DL data arrival for SN terminated SCG bearers);
- The UE suspending its operation with the SCG (e.g. suspending bearers associated with the SCG, like SCG MN-/SN-terminated bearers), but keeping the SCG configuration stored (referred to as Stored SCG); On the network side there can be different alternatives such as the SN storing the SCG as the UE does, or the SN releasing the SCG context of the UE to be generated again upon resume (e.g. with the support from the MN that is the node storing the SCG context for that UE whose SCG is suspended).

Though the power saving aspect is so far discussed from the SCG point of view, it is likely that similar approaches could be used on the MCG as well (e.g. the MCG maybe suspended or in long DRX, while data communication is happening only via the SCG).

SUMMARY

One aspect of the present disclosure provides a method performed by a wireless device configured with Multi-Radio Access Technology Dual Connectivity (MR-DC). The method comprises receiving, from a first network node, at least one message in a reconfiguration procedure for a first cell group. The at least one message indicates a mode of operation of the wireless device for a second cell group by the wireless device.

Another aspect of the present disclosure provides a method performed by a first network node for configuring a wireless device configured with Multi-Radio Access Technology Dual Connectivity (MR-DC). The method comprises sending, to the wireless device, at least one message in a reconfiguration procedure for a first cell group associated with the wireless device. The at least one message indicates a mode of operation of the wireless device for a second cell group.

A further aspect of the present disclosure provides apparatus in a wireless device configured with Multi-Radio Access Technology Dual Connectivity (MR-DC). The apparatus comprises a processor and a memory. The memory contains instructions executable by the processor such that the apparatus is operable to receive, from a first network node, at least one message in a reconfiguration procedure for a first cell group. The at least one message indicates a mode of operation of the wireless device for a second cell group by the wireless device.

A still further aspect of the present disclosure provides apparatus in a first network node for configuring a wireless device configured with Multi-Radio Access Technology Dual Connectivity (MR-DC). The apparatus comprises a processor and a memory. The memory contains instructions executable by the processor such that the apparatus is operable to send, to the wireless device, at least one message in a reconfiguration procedure for a first cell group associated with the wireless device. The at least one message indicates a mode of operation of the wireless device for a second cell group.

An additional aspect of the present disclosure provides apparatus in a wireless device configured with Multi-Radio Access Technology Dual Connectivity (MR-DC). The apparatus is configured to receive, from a first network node, at least one message in a reconfiguration procedure for a first cell group. The at least one message indicates a mode of operation of the wireless device for a second cell group by the wireless device.

A further aspect of the present disclosure provides apparatus in a first network node for configuring a wireless device configured with Multi-Radio Access Technology Dual Connectivity (MR-DC). The apparatus is configured to send, to the wireless device, at least one message in a reconfiguration procedure for a first cell group associated with the wireless device. The at least one message indicates a mode of operation of the wireless device for a second cell group.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
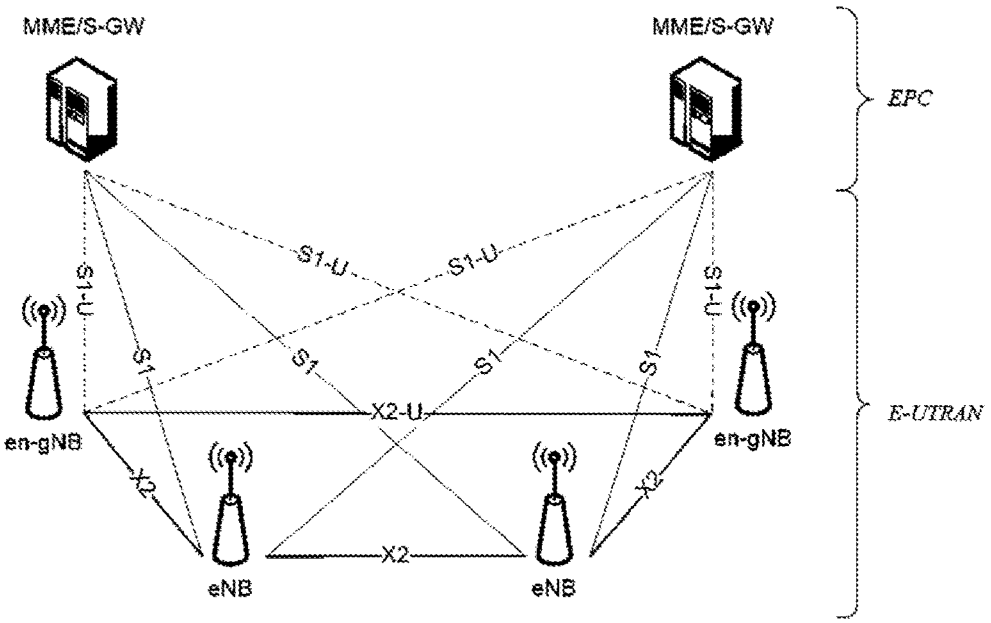
FIG. 1 shows an example of the EN-DC architecture.
Figure 2:
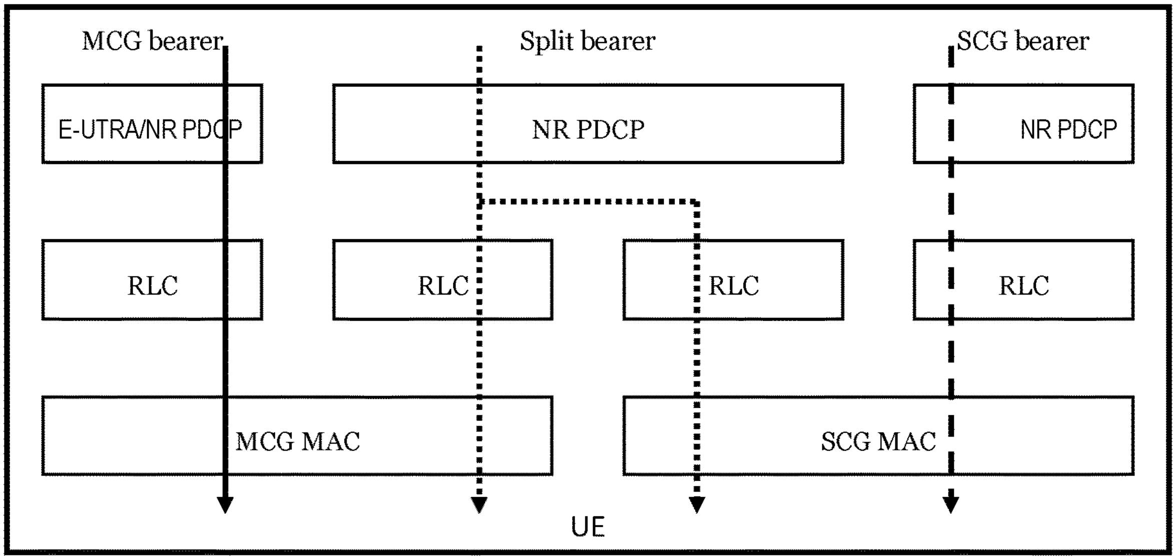
FIG. 2 shows Radio Bearer types in MR-DC.
Figure 3:
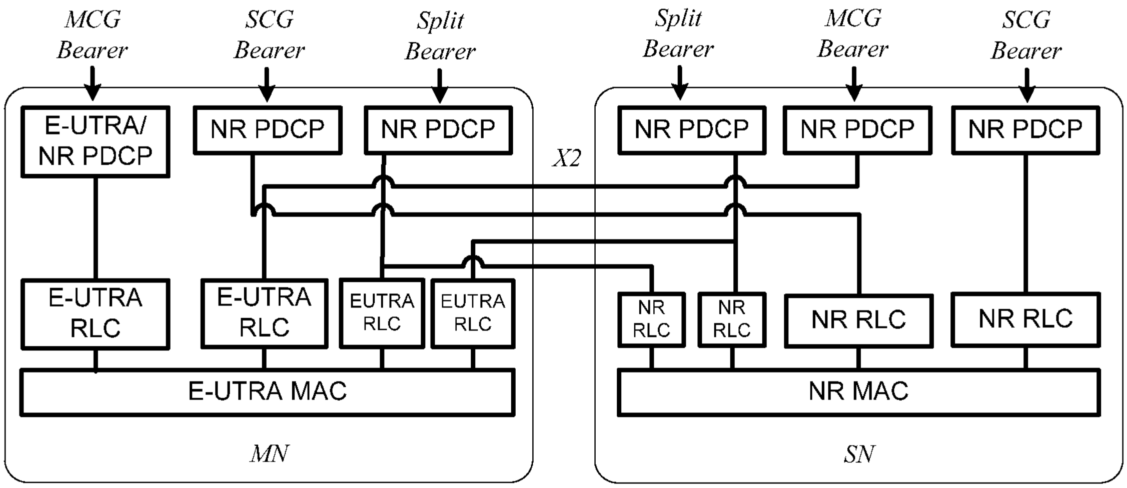
FIG. 3 shows network side protocol termination options for MCG, SCG and split bearers in MR-DC with EPC (EN-DC)
Figure 4:
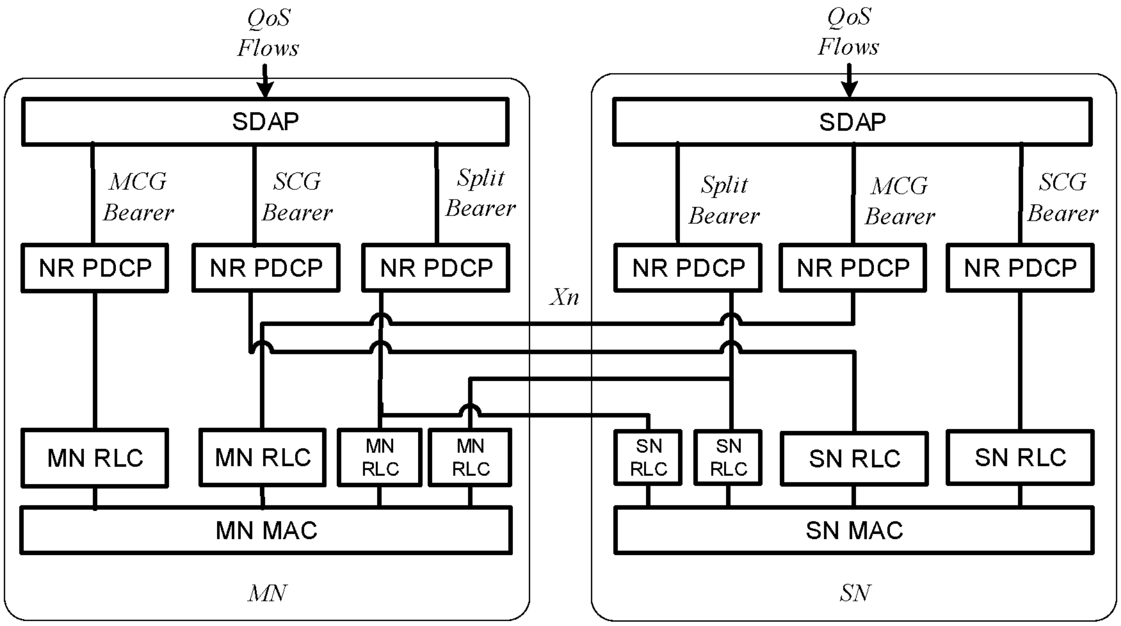
FIG. 4 shows network side radio protocol termination options for MCG, SCG and split bearers in the MN and SN for MR-DC with 5GC.
Figure 5A:
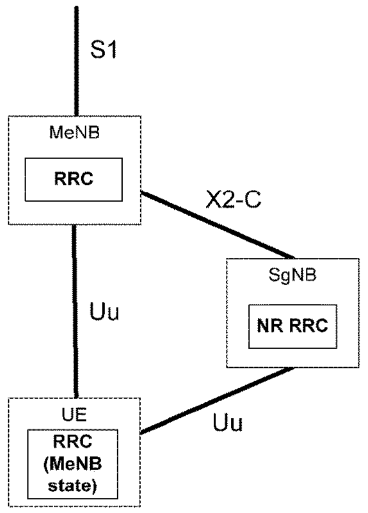
FIG. 5A shows control plane architecture for EN-DC.
Figure 5B:
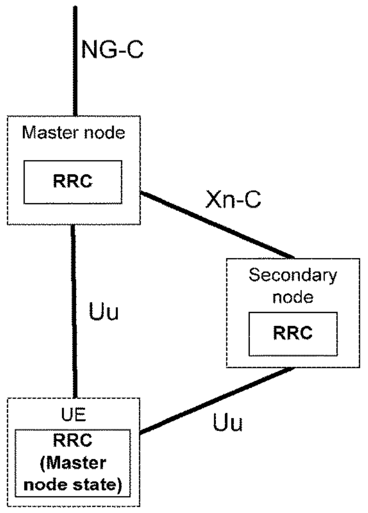
FIG. 5B shows control plane architecture for MR-DC with 5GC.
Figure 6:
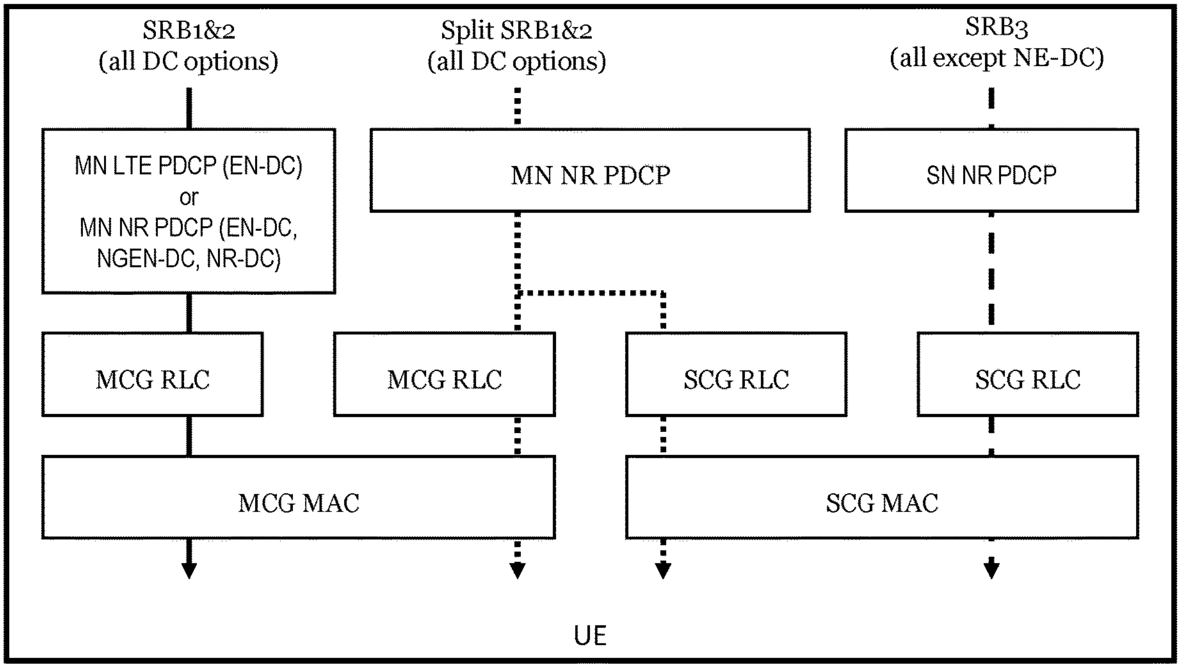
FIG. 6 shows network side protocol termination options for SRBs in MR-DC.
Figure 7:
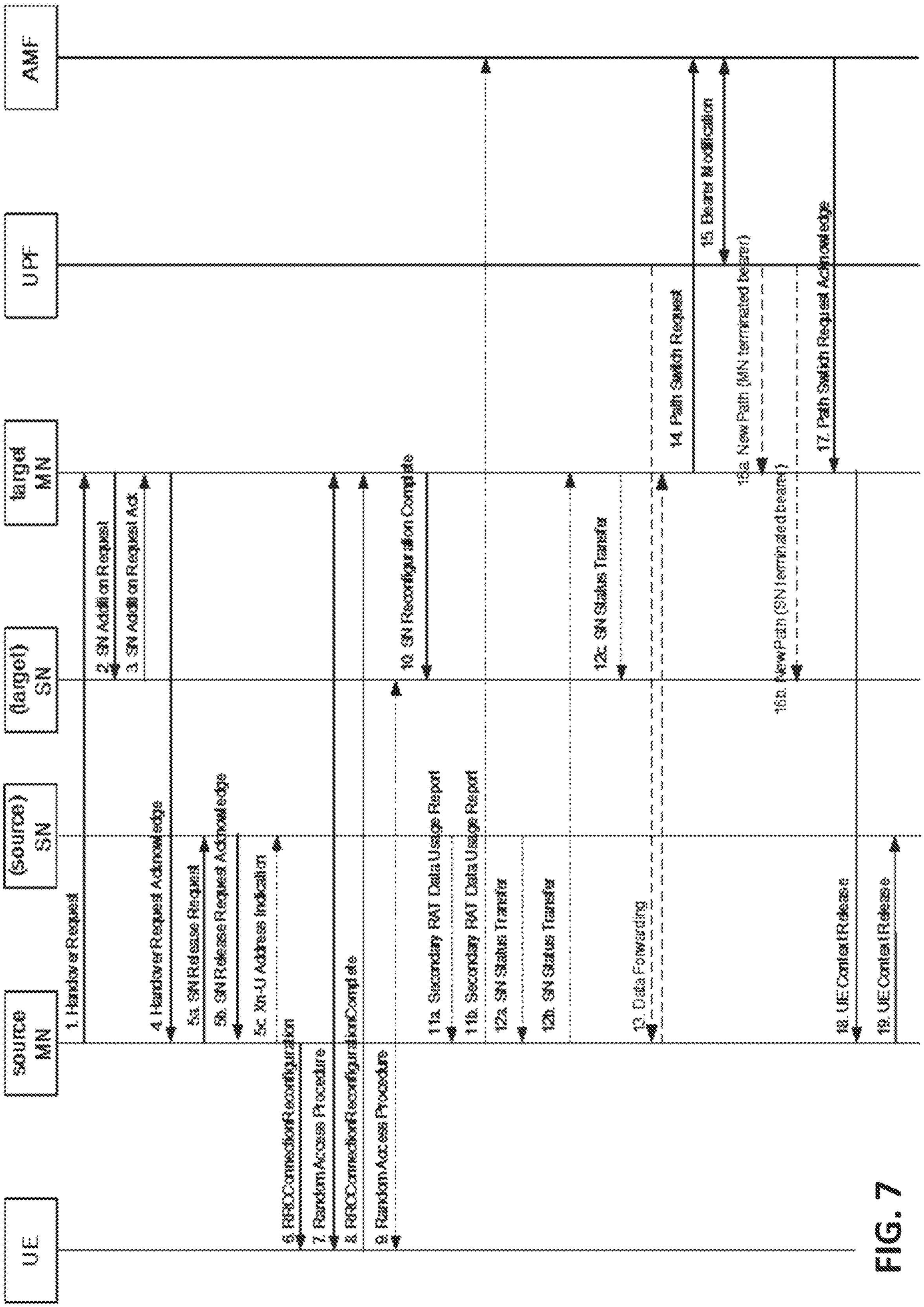
FIG. 7 shows an example signalling flow for inter-MN handover with or without MN initiated SN change.
Figure 8:
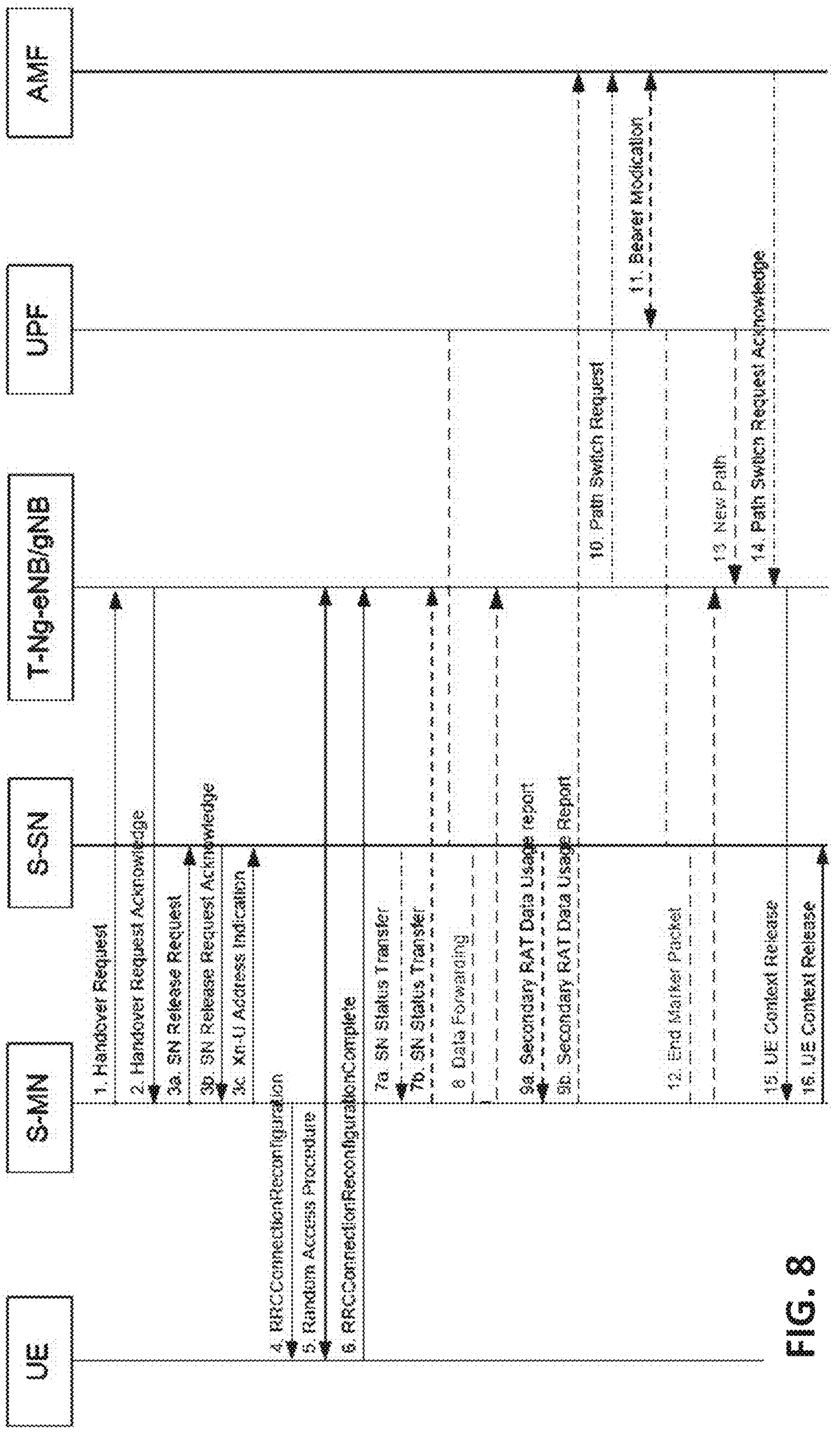
FIG. 8 shows an example signalling flow for MN to ng-eNB/gNB change.
Figure 9:
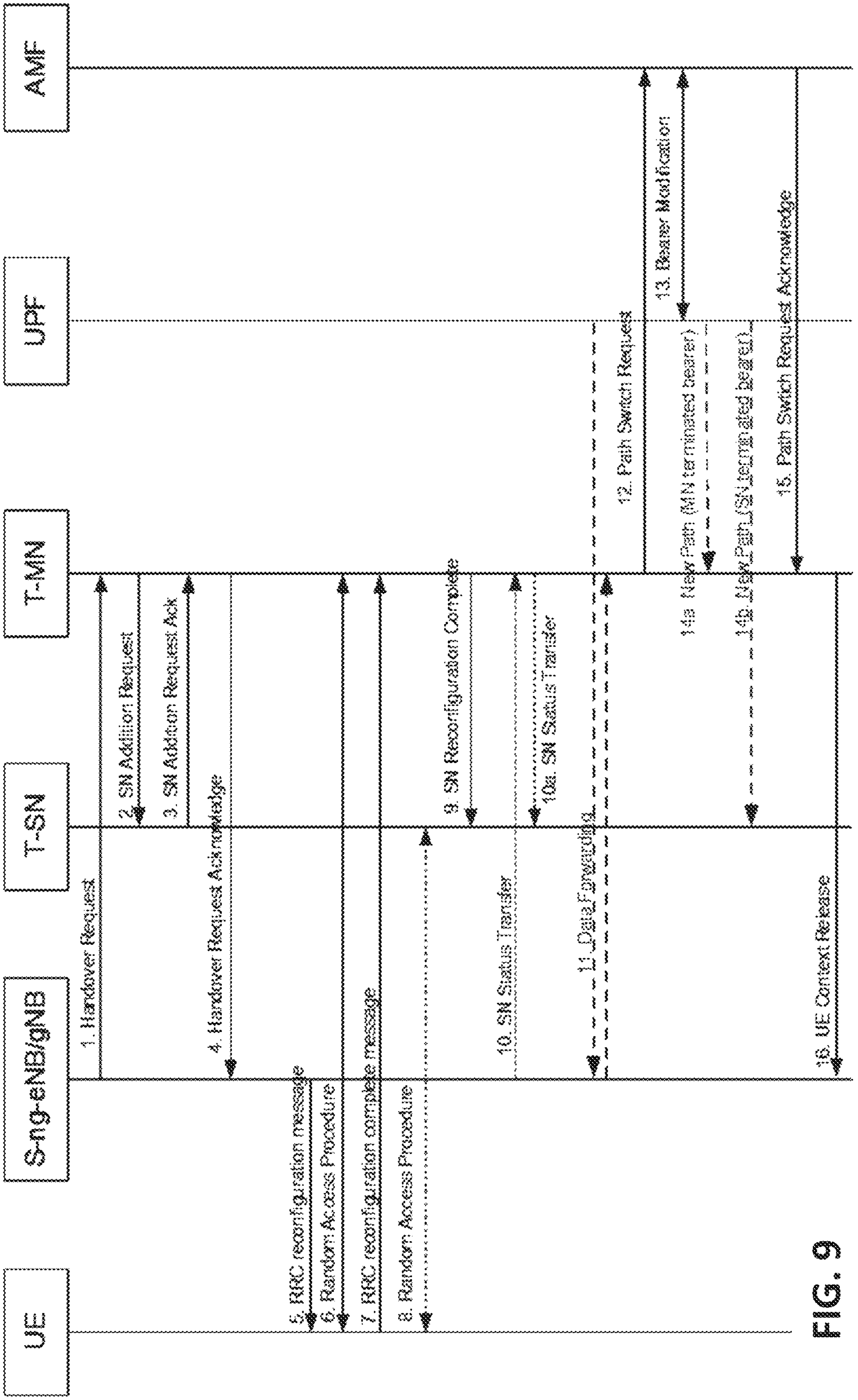
FIG. 9 shows an example signalling flow for ng-eNB/gNB to MN change.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

There currently exist certain challenge(s). For example, in dual connectivity (e.g. MR-DC), the UE can perform UL/DL transmissions/receptions towards a Master Node (MN) and/or Secondary Node (SN) (for data transmission/reception using the associated MCG and/or SCG radio links). In typical scenarios, the MCG can be considered to offer basic coverage and the SCG used to increase the data rate during data bursts. The UE needs to continuously monitor the PDCCH for uplink and downlink scheduling assignments at least on the PCell and the PSCell, and potentially all other SCells if cross carrier scheduling is not employed. Even if cross carrier scheduling is employed, the UE has to perform extra PDCCH monitoring on the PCell or the PSCell for the sake of the SCell, depending on whether the SCell belongs to the MCG or the SCG.

As discussed above, there are several alternatives to put the SCG in power saving mode. In R2-1908679 (Introducing suspension of SCG—Qualcomm), it was proposed that the gNB can indicate to the UE to suspend SCG transmissions when no data traffic is expected to be sent in SCG so that UE keeps the SCG configuration but does not use it for power saving purpose. It has also been discussed that both RLM and RRM should be continued while the UE is operating in this power saving mode for the SCG.

In some examples, while the UE's configured SCG is in power saving mode (e.g. suspended SCG), the UE may move away from the coverage of the PCell (e.g. PCell RSRP starts to drop) and/or the UE may enter the coverage of cells in the same frequency of the PCell that may be in better radio conditions (e.g. a neighbour cell in the same frequency of the PCell has better RSRQ than the PCell, while the SCG is in a power saving mode of operation). As that may create interference in the PCell frequency, the network may want to trigger a PCell change (or an MCG change), possibly towards a target PCell in another node (MCG change with MN change). While there exists procedures currently defined for an MCG mobility with or without an MN change, wherein the SN can be kept, released or changed, these procedures do not take into account the possibility that the SCG may be in a power saving mode of operation.

Certain aspects of the present disclosure and their embodiments may provide solutions to these or other challenges. For example, In summary, examples of this disclosure include actions for a wireless terminal and/or network node(s) actions for an Master Cell Group (MCG) mobility, both with or without MN change (i.e., a PCell change/ reconfiguration with sync), wherein the UE receives a command with the MCG reconfiguration with sync AND an SCG configuration including the SCG mode of operation being set by the target SN (that may be the same as the source SN, depending whether SN is kept, changed or added).

Examples of this disclosure include a method performed by a wireless terminal (also called a User Equipment—UE) configured with Multi-Radio Dual Connectivity (MR-DC), i.e. being configured with a first cell group (e.g. Master Cell Group—MCG) and a second cell group (e.g. Secondary Cell Group—SCG). The method comprises:

Receiving a message including:
- i) a reconfiguration with sync for the first cell group (e.g. reconfiguration with sync for the MCG, for a PCell change, handover, etc.); AND
- ii) (optional) an indication of a mode of operation for a target SpCell associated to a second cell group The target SpCell can correspond to the target PSCell i.e. the PSCell the UE is configured with after the reconfiguration with sync for the first cell group;

The mode of operation for the target SpCell associated to a second cell group can correspond to a power saving mode of operation (e.g. suspended SCG, dormant SCG, SCG with long DRX, PSCell with long DRX, inactivated SCG, deactivated SCG, etc.);

The reconfiguration with sync can correspond to a procedure wherein the UE receives a reconfigurationWithSync field or equivalent; and/or to a handover procedure where the PCell is changed from a Source PCell to a target PCell (with or without MN change i.e. wherein the target PCell is associated to the same MN as the source PCell or a different MN); or to an MCG mobility;

Setting the mode of operation of the second cell group to be the one indicated in the message (e.g. power saving like suspended SCG) and perform actions according to that mode of operation.

Certain embodiments may provide one or more of the following technical advantage(s). For example, some examples of this disclosure may enable for a UE configured with MR-DC to perform MCG mobility procedure while the second cell group (e.g. the SCG) is in a power saving mode of operation (e.g. SCG suspended). The network may then set the mode of operation for a second cell group, like an Secondary Cell Group (SCG) e.g. suspended SCG, for an incoming UE in a PCell mobility procedure. In other words, the UE can move in/out of the PCell coverage and change PCell while having the possibility to have its SCG mode of operation set as part of the same procedure e.g. by a target MN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
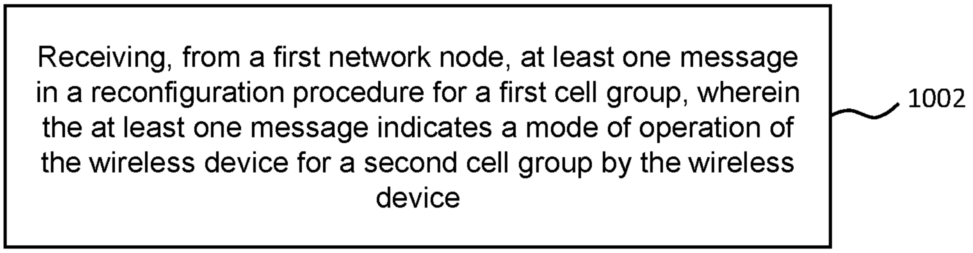
FIG. 10 is a flow chart of an example of a method performed by a wireless device configured with MR-DC.

FIG. 10 is a flow chart of an example of a method 1000 performed by a wireless device (e.g. a UE) configured with Multi-Radio Access Technology Dual Connectivity (MR-DC). The method 1000 comprises, in step 1002, receiving, from a first network node (e.g. a base station, base station-control unit (CU), base station-distributed unit (DU), eNB, eNB-CU, eNB-DU, gNB, gNB-CU or gNB-DU), at least one message (e.g. at least one RRC message and/or at least one RRC reconfiguration message) in a reconfiguration procedure for a first cell group. The at least one message indicates a mode of operation of the wireless device for a second cell group by the wireless device. In some examples, the first cell group comprises a master cell group (MCG) and the second cell group comprises a secondary cell group (SCG). Alternatively, in some examples, the second cell group comprises a master cell group (MCG) and the first cell group comprises a secondary cell group (SCG).

In some examples, the mode of operation of the wireless device for the second cell group comprises a mode of operation of the wireless device for a special cell of the second cell group and/or one or more other cells of the second cell group.

The mode of operation of the wireless device for the second cell group may comprise for example a power saving mode of operation of the wireless device for the second cell group, a special cell of the second cell group and/or one or more other cells of the second cell group, wherein the power saving mode comprises a suspend mode or dormant mode or deactivated mode or inactivated mode of operation. The method 1000 may in some examples comprise operating the second cell group according to the power saving mode of operation. Operating the second cell group according to the power saving mode of operation may comprise for example at least one of: operating a special cell of the second cell group in a dormant mode; operating the special cell of the second cell group in a suspended mode; operating the special cell of the second cell group in a deactivated mode; operating the special cell of the second cell group in an inactivated mode; operating the special cell of the second cell group in a dormant bandwidth part (BWP); stopping monitoring a PDCCH of the special cell and/or at least one other cell of the second cell group; suspending transmission for data radio bearers (DRBs) associated with the second cell group; suspending transmission for DRBs associated with a special cell of the second cell group; suspending transmission for DRBs terminated at a node associated with the second cell group or a special cell and/or at least one other cell of the second cell group; suspending DRBs associated with the second cell group; operating the special cell of the second cell group according to discontinuous reception (DRX); and monitoring a PDCCH on the second cell group only during configured on durations of a DRX cycle for the second cell group and/or at least one cell of the second cell group.

The method 1000 may in some examples comprise storing a configuration associated with the second cell group, and resuming, activating or reactivating the second cell group based on the stored configuration of the second cell group. In some examples, resuming, activating or reactivating the second cell group based on the stored configuration of the second cell group may comprise at least one of: operating a special cell of the second cell group in a normal or active mode; operating the special cell of the second cell group in a non-dormant bandwidth part (BWP); starting monitoring a PDCCH of the special cell and/or at least one other cell of the second cell group; resuming transmission for data radio bearers (DRBs) associated with the second cell group; resuming transmission for DRBs associated with a special cell of the second cell group; resuming transmission for DRBs terminated at a node associated with the second cell group or a special cell and/or at least one other cell of the second cell group; resuming DRBs associated with the second cell group; and exiting discontinuous reception (DRX) of the special cell of the second cell group.

In some examples, the mode of operation of the wireless device for the second cell group comprises a resumed, normal, legacy or active mode.

The method 1000 may in some examples comprise operating the second cell group according to the mode of operation (e.g. suspended mode, resumed mode etc) indicated in the at least one message.

The mode of operation of the wireless device for a second cell group by the wireless device may for example comprise a mode of operation of the wireless device for a special cell associated with the second cell group by the wireless device.

In some examples, the reconfiguration procedure for the first cell group comprises a change of a special cell for the first cell group, a change of at least one other cell for the first cell group, a handover, a reconfiguration with sync of the first cell group and/or a mobility procedure for the wireless device.

In some examples, the at least one message includes an indication of a reconfiguration procedure for the second cell group, and the method comprises applying the reconfiguration procedure for the second cell group in response to a resume or activation command from the first network node. The reconfiguration procedure for the second cell group may comprise for example a change of a special cell for the second cell group, a change of at least one other cell for the second cell group, a handover, a reconfiguration with sync of the second cell group and/or a mobility procedure for the wireless device.

The method 1000 may in some examples comprise performing the reconfiguration procedure for the first cell group.

Figure 11:
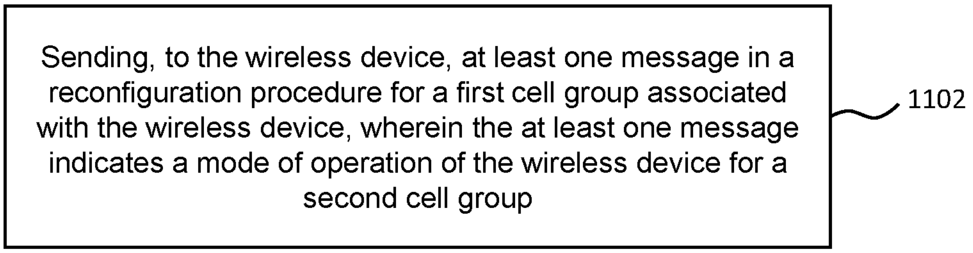
FIG. 11 is a flow chart of an example of a method performed by a first network node for configuring a wireless device configured with MR-DC.

FIG. 11 is a flow chart of an example of a method 1100 method performed by a first network node (e.g. a base station, base station-control unit (CU), base station-distributed unit (DU), eNB, eNB-CU, eNB-DU, gNB, gNB-CU or gNB-DU) for configuring a wireless device (e.g. a UE) configured with Multi-Radio Access Technology Dual Connectivity (MR-DC). The method 1100 comprises, in step 1102, sending, to the wireless device, at least one message (e.g. at least one RRC message and/or at least one RRC reconfiguration message) in a reconfiguration procedure for a first cell group associated with the wireless device. The at least one message indicates a mode of operation of the wireless device for a second cell group. In some examples, the first cell group comprises a master cell group (MCG) and the second cell group comprises a secondary cell group (SCG). Alternatively, for example, the second cell group comprises a master cell group (MCG) and the first cell group comprises a secondary cell group (SCG). The first network node may in some examples be associated with a special cell (SpCell) of the first cell group.

In some examples, the mode of operation of the wireless device for the second cell group comprises a mode of operation of the wireless device for a special cell of the second cell group and/or one or more other cells of the second cell group.

The mode of operation of the wireless device for the second cell group may comprise for example a power saving mode of operation of the wireless device for the second cell group, a special cell of the second cell group and/or one or more other cells of the second cell group, wherein the power saving mode comprises a suspend mode or dormant mode or deactivated mode or inactivated mode of operation. Some examples of the method 1100 may comprise sending at least one further message to the wireless device to cause the wireless device to resume, activate or reactivate the second cell group based on a stored configuration of the second cell group at the wireless device. The method may additionally or alternatively comprise for example stopping transmitting a PDCCH to the wireless device on a special cell associated with the second cell group and/or at least one other cell associated with the second cell group, wherein the mode of operation of the wireless device for the second cell group comprises a resumed, normal, legacy or active mode.

The reconfiguration procedure for the first cell group in some examples comprises a change of a special cell for the first cell group, a change of at least one other cell for the first cell group, a handover, a reconfiguration with sync of the first cell group and/or a mobility procedure for the wireless device.

The at least one message may include for example an indication of a reconfiguration procedure for the second cell group, and the method comprises sending a resume or activation command to the wireless device to cause the wireless device to apply the reconfiguration procedure for the second cell group. In some examples, the reconfiguration procedure for the second cell group comprises a change of a special cell for the second cell group, a change of at least one other cell for the second cell group, a handover, a reconfiguration with sync of the second cell group and/or a mobility procedure for the wireless device.

In some examples, the method 1100 may comprise receiving an indication of the mode of operation of the wireless device for a second cell group from a network node associated with the second cell group before sending the at least one message to the wireless device; and/or sending an indication of the mode of operation of the wireless device for a second cell group to a network node associated with the second cell group; and/or sending context information of the wireless device to a node associated with the first cell group reconfigured according to the reconfiguration procedure.

The terms suspended SCG and SCG in power saving mode are used interchangeably in this disclosure. The term suspended SCG may also be called as deactivated SCG, dormant SCG or inactive SCG. The terms resumed SCG and SCG in non-power saving mode are used interchangeably. The terms resumed SCG may also be called as activated SCG or active SCG. The operation of the SCG operating in resumed or active mode may also be called as normal SCG operation or legacy SCG operation. Examples of operations are UE signal reception/transmission procedures e.g. RRM measurements, reception of signals, transmission of signals, measurement configuration, measurement reporting, evaluation of triggered event measurement reports, etc.

In addition, in this disclosure, the term suspending an SCG can in some examples correspond to any one or more of the following:

- The UE starting to operate the PSCell in dormancy e.g. switching the PSCell to a dormant BWP and/or stopping PDCCH monitoring in PSCell and SCell(s) of the SCG. On the network side, the network considers the PSCell in dormancy and at least stops transmitting PDCCH for that UE in the PSCell and SCell(s) of the SCG;
- The UE deactivating the PSCell like SCell deactivation and stops monitoring PDCCH in PSCell and SCell(s) of the SCG; On the network side, the network considers the PSCell as deactivated and at least stops transmitting PDCCH for that UE in the PSCell;
- The UE suspending its operation with the SCG (e.g. suspending SCG transmission for all DRBs and SRBs or suspending bearers associated with the SCG, like SCG MN-/SN-terminated bearers), but keeping the SCG configuration stored (referred to as Stored SCG); On the network side there can be different alternatives such as the SN storing the SCG as the UE does, or the SN releasing the SCG context of the UE to be generated again upon resume (e.g. with the support from the MN that is the node storing the SCG context for that UE whose SCG is suspended). More details are provided later.
- The UE receives a command from the network to enter long DRX on the SCG, and only monitors PDCCH in PSCell and SCell(s) of the SCG during configured ON durations of the SCG DRX cycle.

This disclosure describes terms like SCG and PSCell, as one of the cells associated with the SCG. That can be for example a PSCell as defined in NR specifications (e.g. RRC TS 38.331), defined as a Special Cell (SpCell) of the SCG, or a Primary SCG Cell (PSCell), for example as follows:

- Secondary Cell Group: For a UE configured with dual connectivity, the subset of serving cells comprising of the PSCell and zero or more secondary cells.
- Special Cell: For Dual Connectivity operation the term Special Cell refers to the PCell of the MCG or the PSCell of the SCG, otherwise the term Special Cell refers to the PCell.
- Primary SCG Cell: For dual connectivity operation, the SCG cell in which the UE performs random access when performing the Reconfiguration with Sync procedure.

The text describes terms like MCG and PCell, as one of the cells associated with the MCG. That can be for example a PCell as defined in NR specifications (e.g. RRC TS 38.331) or LTE specifications (e.g. RRC TS 36.331), defined as a Special Cell (SpCell) of the MCG, or a Primary MCG Cell (PSCell), for example as follows:

- Master Cell Group: For a UE configured with dual connectivity, the subset of serving cells comprising of the primary cell (PCell) and zero or more secondary cells (SCell).
- Special Cell: For Dual Connectivity operation the term Special Cell refers to the PCell of the MCG or the PSCell of the SCG, otherwise the term Special Cell refers to the PCell.
- Primary Cell: The MCG cell, operating on the primary frequency, in which the UE either performs the initial connection establishment procedure or initiates the connection re-establishment procedure.

This disclosure mainly refers to and shows examples wherein the second cell group is a Secondary Cell Group (SCG) that can be suspended, for a UE configured with Dual Connectivity (e.g. MR-DC). However, examples of this disclosure may also be applicable for the case where the second cell group is a Master Cell Group (MCG) for a UE configured with Dual Connectivity (e.g. MR-DC), wherein the MCG could be suspended. In that case, when an SCG mobility is triggered so that the mode of operation of the MCG after the mobility can be set to same or different mode of operation. In that case, instead of a PCell mobility, actions may be related to the PSCell mobility while the MCG is in for example a power saving mode of operation (and may be changed upon PSCell mobility), or in more general terms, the SpCell of the first cell group. Notice that this use case is not the same as the one of an SCG mobility (e.g. from a source SN to a target SN) with the SCG mode of operation being possibly set e.g. the SCG mode of operation that is suspended is modified to normal by the network.

This disclosure mainly refers to and shows examples related to a mobility use case (e.g. a reconfiguration), for example where the UE is configured with MR-DC and a PCell change is triggered. However, many aspects of this disclosure may also be applicable for the case where the UE is being configured with an SCG wherein its mode of operation is set to suspended while the UE is performing an MCG mobility, e.g. even if the UE is not operating in MR-DC, the target MN may determine to add an SCG and determine its mode of operation (like a power saving mode of operation e.g. suspended/dormant/deactivated SCG). For example, the received MCG mobility command with an SCG configuration containing a reconfiguration with sync for the SCG may be stored (and possibly not applied) and only applied when an indication from the network to resume the SCG is received.

When the text refers to an SN RRC Reconfiguration or an SCG RRC Reconfiguration, this may in some examples correspond to an RRC Reconfiguration message as generated by the SN and containing an SCG configuration.

This disclosure may also use the term suspended SCG, SCG suspended, or, when referring to the action of transitioning to suspended SCG, it may use suspending the SCG. In this disclosure, the term resuming an SCG can correspond to any of the following examples:

- The UE transitioning the PSCell from dormancy like behavior to normal active cell behavior (e.g. by switching the PSCell to a non-dormant BWP), and at least starting to monitor PDCCH of one of the cells of the SCG; This transition could be triggered e.g. by network signaling;
- The UE activating the PSCell and at least starting to monitor PDCCH of one of the cells of the SCG; This transition could be triggered e.g. by network signaling;
- The UE restoring the stored SCG configuration and start operating according to the SCG configuration that is resumed (e.g. resumption of SCG transmission/bearers);
- The UE restoring the stored SCG configuration and receiving a message with an SCG configuration (e.g. delta signaling) to be applied on top of the stored SCG configuration that is restored;
- The UE receives a command from the network to exit DRX on the SCG.

This disclosure may also use the term resumed SCG, SCG resume, or, when referring to the action of transitioning to active/resumed SCG, it may use resuming the SCG.

Additional specific example embodiments are provided below. In most of these examples, the request to suspend/resume the SCG (whether it is MN triggered or SN triggered) is accepted/ACKed by the other node (SN, if it was MN triggered; MN, if it was SN triggered). However, example methods may also comprise a procedure where the requests are rejected, e.g. if the MN wants to resume the SCG, but SN maybe not have the required radio resources at that point in time to accommodate the UE. Example methods may also include the case where an active SCG addition/change is rejected by the target SN. In these rejected cases, the UE may receive an indication from the network (e.g. an RRC Reconfiguration message with an MR-DC release indication) indicating that the SCG remains suspended, is to be suspended or the SCG has to be released. In some example methods, the UE can receive an indication to release a stored SCG due to other reasons the network may find suitable e.g. an expiry of a timer on the network side (wherein the timer is defined to determine for how long is it worth storing the SCG context instead of releasing it).

This disclosure describes examples where a UE that is MR-DC capable, e.g. that can be configured with a Master Cell Group (MCG), associated to a network node operating as Master Node (MN), and a Secondary Cell Group (SCG), associated to a network node operating as Secondary Node (SN). The network node operating as MN can for example be a gNodeB (of NR technology) or an eNodeB (LTE node connected to EPC), or an ng-eNodeB (LTE node connected to 5GC). The network node operating as SN can be for example a gNodeB (of NR technology) or an eNodeB, or an ng-eNodeB. A possible combination can be both MN and SN being gNodeB(s) and in that case both MCG and SCG have configured NR cells. Another possible combination can be an MN being an eNodeB and SN being gNodeB(s) and in that case the MCG have configured LTE cells, while the SCG have configured NR cells, so the UE is configured with inter-RAT Dual Connectivity. Where LTE and NR are provided as different RATs, this should be interpreted as examples, so methods of this disclosure may also be applicable for for example to inter-RAT Dual Connectivity with any two different RATs, or in an intra-RAT manner.

This disclosure describes in some examples the reconfiguration (e.g. reconfiguration with sync) procedure, either associated to an MCG or to an SCG. This can correspond for example to a procedure wherein the UE receives a command (e.g. an RRC message like an RRCReconfiguration) that includes a field/IE upon which the UE accesses a target cell indicated in the field/IE (e.g. accesses via random access), and applies configurations associated to that target cell e.g. cell configurations like ServingCellConfigCommon. The reconfiguration with sync procedure can in some examples be associated to a cell group e.g. MCG reconfiguration with sync indicating a target PCell, SCG reconfiguration with sync indicating a target PSCell. The procedure can be used for mobility use cases e.g. a PCell change/MCG mobility, a PSCell change/SCG mobility, or both simultaneously.

A first specific example comprises a method performed by a wireless terminal (also called a User Equipment—UE) configured with Multi-Radio Dual Connectivity (MR-DC), i.e. being configured with a first cell group (e.g. Master Cell Group—MCG) and a second cell group (e.g. Secondary Cell Group—SCG). The method comprises:

Receiving a message including:

a reconfiguration with sync for the first cell group (e.g. reconfiguration with sync for the MCG, for a PCell change, handover, etc.); AND ii) (optional) an indication of a mode of operation for a target SpCell associated to a second cell group The target SpCell can correspond to the target PSCell i.e. the PSCell the UE is configured with after the reconfiguration with sync for the first cell group;

The mode of operation for the target SpCell associated to a second cell group can correspond to a power saving mode of operation (e.g. suspended SCG, dormant SCG, SCG with long DRX, PSCell with long DRX, inactivated SCG, deactivated SCG, etc.);

The reconfiguration with sync can correspond to a procedure wherein the UE receives a reconfigurationWithSync field or equivalent; and/or to a handover procedure where the PCell is changed from a Source PCell to a target PCell (with or without MN change i.e. wherein the target PCell is associated to the same MN as the source PCell or a different MN); or to an MCG mobility;

Setting the mode of operation of the second cell group to be the one indicated in the message (e.g. power saving like suspended SCG) and perform actions according to that mode of operation.

In general term, mobility can correspond to a reconfiguration with sync procedure or a handover procedure;

The target PSCell is the target SpCell indicated in the reconfiguration with sync for the second cell group Upon reception that triggers a PSCell change e.g. an SCG RRC Reconfiguration including a reconfiguration with sync including an indication of a target mode of operating for the new cell;

In one embodiment the message contains a reconfiguration with sync indication for the second cell group;

When it is said "an indication of a mode of operation for the target SpCell" it may correspond to "an indication of a mode of operation for the second cell group"

In other words, the same message indicating a PCell change can include an indication of the mode of operation for the SCG. That message can be an RRCReconfiguration message including a reconfigurationWithSync within the MCG configuration, and, also as part of that, an indication of the mode of operation to be set for the SCG upon reconfiguration with sync (e.g. suspended SCG).

Concerning the MN, the example method comprises the different cases:

The method comprises the case where MN is not changed i.e. the PCell changes but target PCell is also associated to the MN (i.e. Source MN same as Target MN).

The method comprises the case where MN is changed i.e. the PCell changes and the target PCell is associated to a different MN (i.e. Source MN and Target MN not the same network nodes/entities/functions).

Concerning the SN, the example method comprises the different cases:

(SN kept) The method comprises the case the UE is in MR-DC (i.e. connected to a Source SN—S-SN) and receives a command for a PCell change (MCG mobility with or without MN change) including an SCG configuration that includes an indication of the SCG mode of operating e.g. power saving mode of operation, like dormant/deactivate/suspended SCG. This case can be called SN kept, since the PCell mobility occurs but the SN is kept (i.e. the UE context at the SN is maintained, but possibly modified, e.g. in terms of the mode of operation of the SCG). Even if the SN is kept, the PSCell may remain the same (with different or the same mode of operation), or the PSCell may change (with different or the same mode of operation); In summary, one can say the method comprises the cases below:

PSCell is kept, SCG mode of operation remains unchanged (power saving or normal);

PSCell is kept, SCG mode of operation is changed (e.g. from power saving to normal, normal to power saving);

PSCell is changed, SCG mode of operation remains unchanged (power saving or normal);

In this case the UE also receives a reconfiguration with sync for the second cell group, also indicating an SCG mobility; But, as SN is kept, this is for a PSCell associated to the same SN the UE is connected to i.e. S-SN.

PSCell is changed, SCG mode of operation is changed (e.g. from power saving to normal, normal to power saving);

In this case the UE also receives a reconfiguration with sync for the second cell group, also indicating an SCG mobility; But, as SN is kept, this is for a PSCell associated to the same SN the UE is connected to i.e. S-SN.

(SN changed) The method comprises the case the UE is in MR-DC (i.e. connected to a Source SN—S-SN) and receives a command for a PCell change (MCG mobility with or without MN change) including an SCG configuration that also includes a reconfiguration with sync for a PSCell associated to a different SN (denoted a target SN—T-SN) and an indication of the SCG mode of operating e.g. power saving mode of operation, like dormant/deactivate/suspended SCG. This case can be called SN changed, since the PCell mobility and PSCell mobility occur and the PSCell is associated to a T-SN. In summary, one can say the method comprises the cases below:

SCG mode of operation remains unchanged (power saving or normal);

SCG mode of operation is changed (e.g. from power saving to normal, normal to power saving);

(SN added) The method comprises the case the UE is NOT in MR-DC and receives a command for a PCell change (MCG mobility with or without MN change) including an SCG configuration that includes an indication of the SCG mode of operating e.g. power saving mode of operation, like dormant/deactivate/suspended SCG. This case can be called SN added, since the PCell mobility occurs while the UE was not in MR-DC, and the target gNodeB (that becomes a target MN) determines to add an SCG to the UE during the mobility procedure and determines to set the mode of operation of the SCG to be added. In summary, one can say the method comprises the cases below:

SCG mode of operation can be set during MCG mobility to e.g. power saving or normal;

(SN released) The method comprises the case the UE is in MR-DC with suspended SCG and receives a command for a PCell change (MCG mobility with or without MN change) including an SCG configuration release. The release may be due to the fact that the target SN did not have resources to accommodate the suspended SCG or it is a legacy SN that does not support suspended SCG.

In some examples of the method, i) the first cell group is a Master Cell Group—MCG and the second cell group is a Secondary Cell Group—SCG; or ii) the first cell group is a Secondary Cell Group—SCG and the second cell group is a Master Cell Group—MCG.

In some examples of the method, the first mode of operation is a normal operating mode and the second mode of operation is a power saving mode.

In some examples of the method, the first mode of operation is a power saving mode of operation and second mode of operation is a normal mode of operation.

In some examples of the method, the first mode of operation is a power saving mode of operation and second mode of operation is also power saving mode.

In some examples of the method, upon receiving the message indicating that the mode of operation of the target SCG is set to a power saving mode or where the SCG is already in power saving mode (like SCG suspend), storing the received message and delaying applying the message until a second indication is received for resuming the SCG that is in power saving mode of operation.

Inter-Master Node Handover with/without Secondary Node Change

Inter-MN handover with/without MN initiated SN change can in some examples be used to transfer UE context data from a source MN to a target MN while the UE context at the SN is kept or moved to another SN. During an Inter-Master Node handover, the target MN decides whether to keep or change the SN (or release the SN, as described in clause 10.8). Only intra-RAT Inter-Master node handover with/without SN change is supported (e.g. no transition from NGEN-DC to NR-DC).

Figure 12:
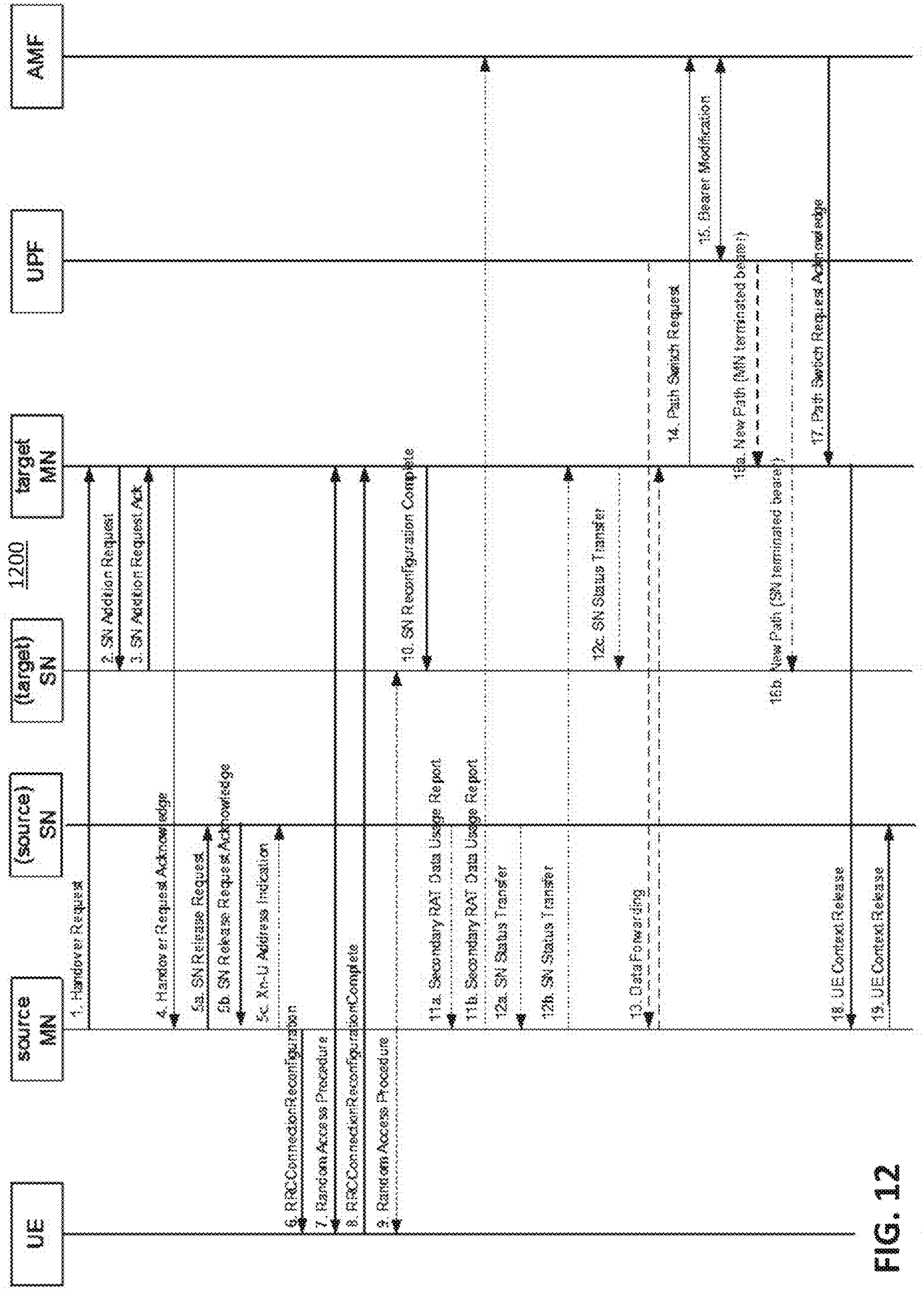
FIG. 12 shows an example signalling flow for an example method for inter-MN handover with or without MN initiated SN change.

FIG. 12 shows an example signalling flow for an example method 1200 for inter-MN handover with or without MN initiated SN change. According to this example method 1200, in inter-MN handover with/without MN initiated SN change the UE context data from a source MN to a target MN may contain an indication of the mode of operation of the SCG in the UE's current configuration. Concerning the UE context at the SN, that comprises the indication of the SCG mode of operation (e.g. suspended/dormant SCG). In some examples, for an Inter-Master Node handover without Secondary Node change, the source SN and the target SN shown in FIG. X8 may be the same node. The method 1200 comprises the following steps described below.

In step 1, the source MN starts the handover procedure by initiating the Xn Handover Preparation procedure including both MCG and SCG configuration. The source MN includes the source SN UE XnAP ID, SN ID and the UE context in the source SN in the Handover Request message. In addition, that message may comprise the mode of operation of the SCG e.g. suspended/dormant/deactivated SCG, possibly as part of the SCG configuration, or transmitted outside the RRC container (XnAP message), or transmitted in both the RRC container and in the XnAP Handover Request message. That has the potential to enable the target MN to determine to keep or modify the mode of operation of the SCG (e.g. if suspended SCG, remain suspended SCG; if SCG is normal/active, suspend the SCG), or to indicate to a target SN the current SCG mode of operation, so that the target SN can determine to either modify or keep the SCG mode of operation.

The source MN may trigger the MN-initiated SN Modification procedure (to the source SN) to retrieve the current SCG configuration and to allow provision of data forwarding related information before step 1. That retrieval may comprise information indicating the SCG mode of operation e.g. indicating whether the SCG is in power saving mode (like SCG suspended/dormant/long DRX), so that the MN can possibly include that information when performing the handover request towards a target MN.

There can be different options regarding which node determines the mode of operation of the SCG after the MCG reconfiguration with sync (MCG mobility with or without MN change):

Option a) MN determines the mode of operation of the target PSCell; or

Option b) SN determines the mode of operation of the target PSCell.

Option a) MN Determines the Mode of Operation of the Target PSCell

In one option, during an Inter-Master Node handover, the target MN decides whether to keep or change the SN (or release the SN); In addition, the MN also decides/determines the mode of operation for the target SCG (e.g. power saving mode of operation, like suspended SCG). Upon that decision/determination (e.g. upon reception of the 1. Handover Request message), the target MN includes the result of that decision i.e. the mode of operation of the SCG, in the 2. SN Addition Request message to the target SN (which may be the same as the Source SN, or a different target).

Thanks to that, the target SN may set the SCG mode of operation in the SCG RRC Reconfiguration (to be received by the UE) according to what has been determined by the MN.

Option b) SN Determines the Mode of Operation of the Target PSCell

In one option, during an Inter-Master Node handover, the target MN decides whether to keep or change the SN (or release the SN); In this case, the MN does not decides/determines the mode of operation for the target SCG (e.g. power saving mode of operation, like suspended SCG), but it is the SN that determines, i.e., the Source SN (in case the MN determines to keep the SN), or the Target SN (in case the MN determines to change the SN).

In step 2, if the target MN decides to keep the source SN, the target MN sends SN Addition Request to the SN including the SN UE XnAP ID as a reference to the UE context in the SN that was established by the source MN.

Option a) MN Determines the Mode of Operation of the Target PSCell

Upon reception of the SN Addition Request message, the SN (that is the Source SN) identifies the current mode of operation of the SCG e.g. suspended SCG, as the SN can retrieve the UE context at the SN, and that contains the indication of the current's SCG mode of operation e.g. suspended SCG. In other words, that may be done by the fact the message includes the SN UE XnAP ID as a reference to the UE context in the SN. According to this option, the SN sets the SCG mode of operation in the RRC SCG Reconfiguration that the SN generates to be the mode of operation indicated by the MN in the SN Addition Request message (which may be the same or different from the mode of operation in the UE's current configuration/context). Or, if a need code M (or equivalently specified for need for S upon absence) is defined for the field related to the SCG mode of operation, the SN may leave the field empty if the MN has determined that the SCG mode of operation is to remain unchanged.

Option b) SN Determines the Mode of Operation of the Target PSCell

Upon reception of the SN Addition Request message, the SN (that is the Source SN) identifies the current mode of operation of the SCG e.g. suspended SCG. Then, it determines whether after the MCG mobility that mode of operation for the SCG is to remain the same or to be changed.

According to this option, the SN sets the SCG mode of operation in the RRC SCG Reconfiguration that the SN generates to be the mode of operation that it has determined (which may be the same or different from the mode of operation in the UE's current configuration/context).

If the target MN decides to change the SN, the target MN sends the SN Addition Request to the target SN including the UE context in the source SN that was established by the source MN.

Option a) MN Determines the Mode of Operation of the Target PSCell

Upon reception of the SN Addition Request message, the target SN (that is not the same as the Source SN) identifies the current mode of operation of the SCG e.g. suspended SCG, as the target SN has received in the SN Addition Request message the UE context in the source SN that was established by the source MN; that context contains the indication of the current's SCG mode of operation e.g. suspended SCG. Even though in this option the SN is not determining the SCG mode of operation after the MCG mobility, it may still be useful to know the current mode of operation in case absence of a value for the corresponding field is used as a way to indicate to the UE that the UE shall use the stored value. According to this option, the SN sets the SCG mode of operation in the RRC SCG Reconfiguration that the SN generates to be the mode of operation indicated by the MN in the SN Addition Request message (which may be the same or different from the mode of operation in the UE's current configuration/context). Or, if a need code M (or equivalently specified for need for S upon absence) is defined for the field related to the SCG mode of operation, the SN may leave the field empty if the MN has determined that the SCG mode of operation is to remain unchanged.

Option b) SN Determines the Mode of Operation of the Target PSCell

Upon reception of the SN Addition Request message, the SN (that is the Source SN) identifies the current mode of operation of the SCG, as the target SN has received in the SN Addition Request message the UE context in the source SN that was established by the source MN; that context contains the indication of the current's SCG mode of operation e.g. suspended SCG. Even though in this option the SN is not determining the SCG mode of operation after the MCG mobility, it may still be useful to know the current mode of operation in case absence of a value for the corresponding field is used as a way to indicate to the UE that the UE shall use the stored value. Then, the target SN determines whether after the MCG mobility that mode of operation for the SCG is to remain the same or to be changed. According to this option, the SN sets the SCG mode of operation in the RRC SCG Reconfiguration that the SN generates to be the mode of operation that it has determined (which may be the same or different from the mode of operation in the UE's current configuration/context). Or, if a need code M (or equivalently specified for need for S upon absence) is defined for the field related to the SCG mode of operation, the SN may leave the field empty if the MN has determined that the SCG mode of operation is to remain unchanged.

In step 3, The (target) SN replies with SN Addition Request Acknowledge. The (target) SN may include the indication of the full or delta RRC configuration. The message also includes the SCG RRC Reconfiguration that includes the SCG mode of operation e.g. power saving mode of operation as set by the SN (as described in step 2). That may also be called an SN RRC Reconfiguration.

In step 4, the target MN includes within the Handover Request Acknowledge message the MN RRC reconfiguration message to be sent to the UE in order to perform the handover (that including the SN RRC Reconfiguration that includes the indication of the SCG mode of operation e.g.

suspended/dormant/deactivated SCG), and may also provide forwarding addresses to the source MN. The target MN indicates to the source MN that the UE context in the SN is kept if the target MN and the SN decided to keep the UE context in the SN in step 2 and step 3. In addition, the target MN may indicate to the source MN that the mode of operation of the SCG remains unchanged, if the network node (e.g. target MN, or Target SN, or Source SN, depending on options a) or b)) decided not to modify/change the SCG mode of operation in step 2 and step 3.

In step 5*a*/5*b*, in the legacy procedure, the source MN sends SN Release Request message to the (source) SN including a Cause indicating MCG mobility. The (source) SN acknowledges the release request. The source MN indicates to the (source) SN that the UE context in SN is kept, if it receives the indication from the target MN. If the indication as the UE context kept in SN is included, the SN keeps the UE context. However, according to the method, these steps are NOT performed if the UE's current mode of operation of the SCG is set to dormant/suspended/deactivated. The reasoning is that these steps are performed to stop data transmission associated to the SCG and to support data forwarding; hence, if the SCG is in power saving mode of operation when the Source MN receives the Handover Request Ack message, the SCG transmissions are already stopped and packet forwarding is not needed. This is another motivation for the MN to be aware of the SCG mode of operation.

In step 5*c*, in legacy, the source MN sends XN-U Address Indication message to the (source) SN to transfer data forwarding information. More than one data forwarding addresses may be provided if the PDU session is split in the target side. However, as in 5*a*/5*b*, according to the method, these steps are NOT performed if the UE's current mode of operation of the SCG is set to dormant/suspended/deactivated at least for the same reasons described in the previous step.

In step 6, the source MN triggers the UE to perform handover and apply the new configuration. The MN sends to the UE an RRC Reconfiguration message (RRCReconfiguration*) including an MCG reconfiguration with sync (indicating the target PCell, associated to the target MN), and an SCG RRC Reconfiguration (possibly denoted SN RRC Reconfiguration, RRCReconfiguration) including at least an indication of the SCG mode of operation (e.g. suspended/dormant/deactivate SCG).

That SN RRC reconfiguration can be an RRCReconfiguration message (or equivalent) as generated by the Target SN and may include an indication indicating the mode of operation of the SCG to be set/assumed by the UE when the procedure is performed. An example is shown below, wherein the RRCReconfiguration message containing the masterCellGroup of IE CellGroupConfig containing a reconfiguration with sync (reconfigurationWithSync of IE ReconfigurationWithSync), also contains the SCG RRC Reconfiguration including an explicit indication of the mode of operation as part of the CellGroupConfig IE, since that mode of operation is applicable for the whole cell group. For example, the MN sets the nr-scg field to the RRCReconfiguration within RRCReconfiguration*. In this example, this is the RRCReconfiguration* UE receives from MN (with MCG's reconfiguration with sync):

```
RRCReconfiguration-v1530-IEs ::=            SEQUENCE {
   masterCellGroup                          OCTET STRING (CONTAINING
CellGroupConfig)                              OPTIONAL, -- Need M
. . .
}
RRCReconfiguration-v1560-IEs ::=           SEQUENCE {
   mrdc-SecondaryCellGroupConfig              SetupRelease { MRDC-
SecondaryCellGroupConfig } OPTIONAL,       -- Need M
. . .
}
. . .
. . .
-- Configuration of one Cell-Group:
CellGroupConfig ::=                          SEQUENCE {
. . .
   spCellConfig                                  SpCellConfig
OPTIONAL,       -- Need M
. . .
}
-- Serving cell specific MAC and PHY parameters for a SpCell:
SpCellConfig ::=                           SEQUENCE {
...
   reconfigurationWithSync                 ReconfigurationWithSync
OPTIONAL,   -- Cond ReconfWithSync
...
}
MRDC-SecondaryCellGroupConfig ::=          SEQUENCE {
   mrdc-ReleaseAndAdd                         ENUMERATED {true}
OPTIONAL,   -- Need N
   mrdc-SecondaryCellGroup                    CHOICE {
      nr-SCG                                     OCTET STRING (CONTAINING
RRCReconfiguration),
      eutra-SCG                                  OCTET STRING
   }
}
```

In this example, this is the RRCReconfiguration that is inside the RRCReconfiguration*:

```
RRCReconfiguration-IEs ::=            SEQUENCE {
  radioBearerConfig                     RadioBearerConfig
OPTIONAL, -- Need M
  secondaryCellGroup                    OCTET STRING (CONTAINING
CellGroupConfig)                          OPTIONAL, -- Cond SCG
  measConfig                            MeasConfig
OPTIONAL, -- Need M
  lateNonCriticalExtension              OCTET STRING
OPTIONAL,
  nonCriticalExtension                  RRCReconfiguration-v1530-IEs
OPTIONAL
}
. . .
-- Configuration of one Cell-Group:
CellGroupConfig ::=                    SEQUENCE {
. . .
  modeOfOperation                          ENUMERATED {suspend,
active},
  spCellConfig                             SpCellConfig
OPTIONAL,   -- Need M
. . .
}
-- Serving cell specific MAC and PHY parameters for a SpCell:
SpCellConfig ::=                      SEQUENCE {
...
  reconfigurationWithSync             ReconfigurationWithSync
OPTIONAL,   -- Cond ReconfWithSync
...
}
...
// first loop with MCG reconfiguration with sync (UE applies
RRCReconfiguration*)
// second loop for SCG RRC Reconfiguration (RRCReconfiguration) including
SCG mode of operation
```

5.3.5.5 Cell Group Configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroup-Config IE.

The UE performs the following actions based on a received CellGroupConfig IE:

1> if the CellGroupConfig contains the modeOfOperation set to 'suspend':

2> stop SCG transmission for all radio bearers;

2> consider the SCG as suspended and perform the actions as specified in 5.3.5.5.X;

1> if the CellGroupConfig contains the modeOfOperation set to 'active;

2> resume all suspended radio bearers and resume SCG transmission for all radio bearers, if suspended;

2> consider the SCG as active and perform the actions as specified in 5.3.5.5.X;

In another example, the RRCReconfiguration message containing the secondaryCellGroup of IE CellGroupConfig contains an indication indicating if the mode of operation of the SCG is to be set to a power saving mode of operation (e.g. suspended SCG). The absence of such indication is to be interpreted by the UE as the setting of the mode of operation to normal (i.e. not in power saving state).

```
RRCReconfiguration-IEs ::=       SEQUENCE {
  radioBearerConfig                  RadioBearerConfig
```

-continued

```
OPTIONAL, -- Need M
  secondaryCellGroup                OCTET STRING (CONTAINING
CellGroupConfig)                      OPTIONAL, -- Cond SCG
  measConfig                        MeasConfig
OPTIONAL, -- Need M
  lateNonCriticalExtension          OCTET STRING
OPTIONAL,
  nonCriticalExtension              RRCReconfiguration-v1530-IEs
OPTIONAL
}
. . .
-- Configuration of one Cell-Group:
CellGroupConfig ::=                SEQUENCE {
. . .
  suspended-SCG                       ENUMERATED {true}
OPTIONAL,       -- Cond
. . .
}
```

Upon the reception of the message, there may be further UE actions depending how the mode of operation of the SCG has been set and whether that has been modified or not. Different scenarios are considered:

Scenario A) SCG is in power saving mode before MCG mobility→SCG is in power saving mode after MCG mobility Scenario B) SCG is in active/normal mode before MCG mobility→SCG is in power saving mode after MCG mobility Scenario C) SCG is in power saving mode before MCG mobility→SCG is in active/normal mode before MCG mobility MCG reconfiguration with sync, but SCG is not.

Not even configuration for SCG, nothing happens; if there is some configuration, that is stored and not applied.

If the mode is changed from power saving to normal, the UE is there.

Scenario A) SCG is in Power Saving Mode Before MCG Mobility→SCG is in Power Saving Mode after MCG Mobility In a first alternative, the UE receives the SCG RRCReconfiguration (e.g. RRCReconfiguration message) and, if the message contains the indication indicating that the SCG is to be considered in a power saving mode of operation (e.g. suspended SCG) and the SCG is already in power saving mode, the UE stores the message, or at least some parts of the message, but it does not apply the message, or at least some parts of the message (e.g. reconfigurationWithSync of IE ReconfigurationWithSync) upon reception, but only when it receives a command from the network indication a change of mode of operation for the SCG (in this case from power saving to normal mode of operation). Notice that this may be a re-configuration of the SCG including or not a reconfiguration with sync. In other words, upon reception of the message there is no random-access procedure triggered towards the PSCell, but only with the MCG as part of the MCG reconfiguration with sync. Compliance check and the transmission of a complete message can be handled in different ways:

- In one option, upon reception of the message the UE perform compliance check. If successful compliance the UE transmits an indication to the network acknowledging the reception of the message e.g. an RRC Reconfiguration Complete. Upon reception of that message, the network (e.g. the SN) is aware that the PSCell reconfiguration procedure for an SCG to be in suspended mode of operation was successful and that the message is stored at the UE (to be applied upon reception of another command for resuming the SCG, at some point determined by the network).
- In another option, the UE does not perform compliance check upon reception of the message, but only when it needs to apply it and start operating according e.g. when it receives a command from the network to transition to normal mode of operation. Only upon resumption (or transition from power saving mode of operation to normal/active mode of operation) the UE performs compliance check and transmits an indication to the network acknowledging the reception of the message e.g. an RRC Reconfiguration Complete. Upon reception of that message, the network (e.g. the SN) is aware that the PSCell reconfiguration during MCG mobility procedure for an SCG that was in suspended mode of operation was is successful.
- For both of these options, in case the UE is unable to comply with the message (inability to comply), the UE performs at least one of the following actions:
  - Continue using the configuration used prior to the reception of RRCReconfiguration message; That may include that the UE considers the SCG mode of operation prior to the reception of the message;
  - if MCG transmission is not suspended, initiate the SCG failure information procedure as specified in subclause 5.7.3 to report SCG reconfiguration error, upon which the connection reconfiguration procedure ends, possibly including information regarding the failure and mode of operation in the SCG failure report; or
  - initiate the connection re-establishment procedure as specified in clause 5.3.7, upon which the connection reconfiguration procedure ends;

The core idea in this first alternative is that upon reception of the message with the indication of power saving mode for the SCG (e.g. suspended SCG), the UE does not perform the actions as if the message would have been applied i.e. the fact that the UE stores the message without applying should be interpreted as a possible implementation of the method. Assuming the modeling, what is described as the first option may have a different flavor if delta signaling is applicable e.g. if the SCG RRCReconfiguration message does not contain an indication of being a full configuration. In that case, there may be different options:

- In one option, upon reception of the SCG reconfiguration (e.g. an SCG RRCReconfiguration), the UE stores both configurations, i) the UE's current SCG configuration (which could be stored as an RRCReconfiguration* or a UE variable), and the received the SCG configuration (e.g. SCG RRCReconfiguration) during MCG mobility; Then, upon reception of the command to resume the SCG, both configurations are restored and the UE applies the SCG configuration according to the latest received (e.g. UE applies RRCReconfiguration) having the UE's current SCG configuration as baseline (or current SCG configuration);
- In another option, the UE first generates an SCG configuration that is equivalent to a configuration as if the UE would have applied the received SCG configuration having the UE's current SCG configuration before the MCG mobility as baseline; that final configuration is then stored and it is only applied upon reception of the command to resume the SCG;
- In another option, only full config is allowed, to simplify the procedure;

In a second alternative, the UE receives the SCG RRCReconfiguration message (RRCReconfiguration) and, if the message contains the indication indicating that the SCG is to be considered in a power saving mode of operation (e.g. suspended SCG), the UE applies the message and perform actions upon at least in this case the message is received during MCG mobility (i.e. same message contains the indication of SCG mode of operation and an MCG reconfiguration with sync).

In a third alternative, the UE receives the SCG RRCReconfiguration message (RRCReconfiguration) and, if the message contains the indication indicating that the SCG is to be considered in a power saving mode of operation (e.g. suspended SCG), the UE checks another indication indicating whether the message is to be applied upon reception (so that the UE behaves as the second alternative) or whether the message is to be stored and only applied upon reception of another command transitioning the SCG from power saving mode to normal/active/activated mode of operation (so that the UE behaves as the first alternative).

As in this scenario both source and target SCG(s), i.e. target PSCell and source PScell, are both in power saving mode of operation (e.g. both are associated to suspended/deactivated SCG(s)), SCG transmissions are already suspended when the PSCell change is triggered. In other scenarios where a transition of mode of operations occur further actions may be required.

As in this scenario the source SCG is in power saving mode of operation, the UEs current SCG configuration is stored. Thus, before applying another SCG configuration (e.g. SCG RRC Reconfiguration for target SCG) the UE's current SCG configuration is restored. In any of these alternatives the UE could perform random-access with the PSCell indicated in the message, depending on certain criteria e.g. in the case there is a new PSCell, and the UE also transmits an RRC Reconfiguration Complete (via the MN); or, in case there is change in the mode of operation (e.g. from power saving to normal), even in the case the PSCell does not change. Upon performing these actions, the UE may consider the SCG in power saving mode of operation (e.g. suspended/deactivated SCG) and perform actions accordingly. These options are further explorer later in the scenario where there is a change of SCG mode of operation during SCG mobility.

Scenario B) SCG is in Active/Normal Mode Before MCG Mobility→SCG is in Power Saving Mode after MCG Mobility In scenario B, the first, second and third alternatives of scenario A are also applicable. In addition, the UE also suspends/stops/discontinues the SCG transmissions; the reasoning is that the source SCG is in active/normal mode of operation, while the target SCG is in power saving mode i.e. SCG transmissions are not to be continued after the PSCell Change. In other words, SCG transmissions are not resumed if suspended, in case the mode of operation set for target SCG indicates a power saving mode of operation.

Scenario C) SCG is in Power Saving Mode Before MCG Mobility→SCG is in Active/Normal Mode Before MCG Mobility In scenario C, the second alternative of scenarios A and B are also applicable. In other words, the UE may also perform the actions described accordingly. However, as in this scenario the UE's current SCG mode of operation is power saving mode of operation, the UEs current SCG configuration is stored. Thus, before applying another SCG configuration (e.g. SCG RRC Reconfiguration for target SCG) the UE's current SCG configuration is restored.

the reconfiguration with sync (e.g. it performs random access in the target PSCell) before entering in power saving mode for the SCG (e.g. before suspending an SCG);

Third alternative:

An indication controls whether actions according to first or second alternatives are performed;

Below we show an example of possible implementations in the RRC specifications concerning the first alternative.

First Alternative

Another aspect that could be considered in this first alternative is how the UE is aware that the SCG RRC Reconfiguration is not to be applied, but only stored (and applied only upon reception of the resume/Activation command).

In one option the SCG RRC Reconfiguration message is comprised within an IE, possibly in an RRC container, wherein the field of the associated IE indicates that the target SCG mode is to be set to power saving mode, like suspended SCG. That SCG RRC Reconfiguration message is to be stored. That IE is included in another RRCReconfiguration message received by the UE and that may not contain other configuration(s) but only the IE, or may contain some configuration(s) the network wants the UE to apply upon reception e.g. some bearer reconfiguration to be applied upon reception. In this example a UE variable is used to model the UE storing the SCG configuration(s).

In this example it is also assumed that the command indicating the resume of a suspended SCG is transmitted via RRC, though other alternatives (e.g. MAC CE) are also possible alternatives.

```
// first loop when the UE receives the SCG configuration including the mode
of operation, during MCG // mobility
RRCReconfiguration-v1710-IEs ::=            SEQUENCE {
. . .
   suspendConfig-SCG-r17                         SuspendConfig-SCG-r17
OPTIONAL, -- Need M
. . .
   nonCriticalExtension                       SEQUENCE { }
OPTIONAL
}
. . .
SuspendConfig-SCG-r17 ::=   SEQUENCE {
. . .
   nr-suspend-scg                                OCTET STRING
(CONTAINING RRCReconfiguration)          OPTIONAL,       -- Cond XXX
. . .
}
```

Possible Implementation in RRC Specs

In these different scenarios, there are some common aspects:

First alternative:

If the target SCG mode of operation is power saving (e.g. SCG suspended) the UE does not apply the reconfiguration with sync e.g. it does not perform random access in the target PSCell;

Second alternative:

Regardless of the target SCG mode of operation (e.g. SCG suspended or normal/Active), the UE applies 5.3.5.3 Reception of an RRCReconfiguration by the UE The UE shall perform the following actions upon reception of the RRCReconfiguration, or upon execution of the conditional reconfiguration (CHO or CPC):

. . .

1> if the RRCReconfiguration message includes the suspendConfig-SCG:

2> suspend SCG transmission for all radio bearers, if not suspended;

2> store SCG configuration;

2> store the nr-suspend-scg;

```
// second loop when the UE receives the command to resume the PSCell that
is suspended, e.g.,
// since the PSCell Change
```

-continued

```
RRCReconfiguration-v1710-IEs ::=          SEQUENCE {
...
   resume-SCG-r17                              FFS! OPTIONAL, -- Need
M
...
   nonCriticalExtension                     SEQUENCE { }
OPTIONAL
}
```

1> if the RRCReconfiguration message includes the resume-SCG:

2> restore the SCG configuration;

2> apply the stored the nr-suspend-scg;

2> resume all suspended radio bearers and resume SCG transmission for all radio bearers;

. . .

5.3.5.3 Reception of an RRCReconfiguration by the UE

The UE shall perform the following actions upon reception of the RRCReconfiguration, or upon execution of the conditional reconfiguration (CHO or CPC):

. . .

1> if the RRCReconfiguration includes the secondaryCellGroup:

2> perform the cell group configuration for the SCG according to 5.3.5.5;

. . .

5.3.5.5 Cell Group Configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:

1> if the CellGroupConfig contains the spCellConfig with reconfigurationWithSync:

2> resume all suspended radio bearers and resume SCG transmission for all radio bearers, if suspended;

2> perform Reconfiguration with sync according to 5.3.5.5.2;

. . .

Master Node to eNB/gNB Change

Figure 13:
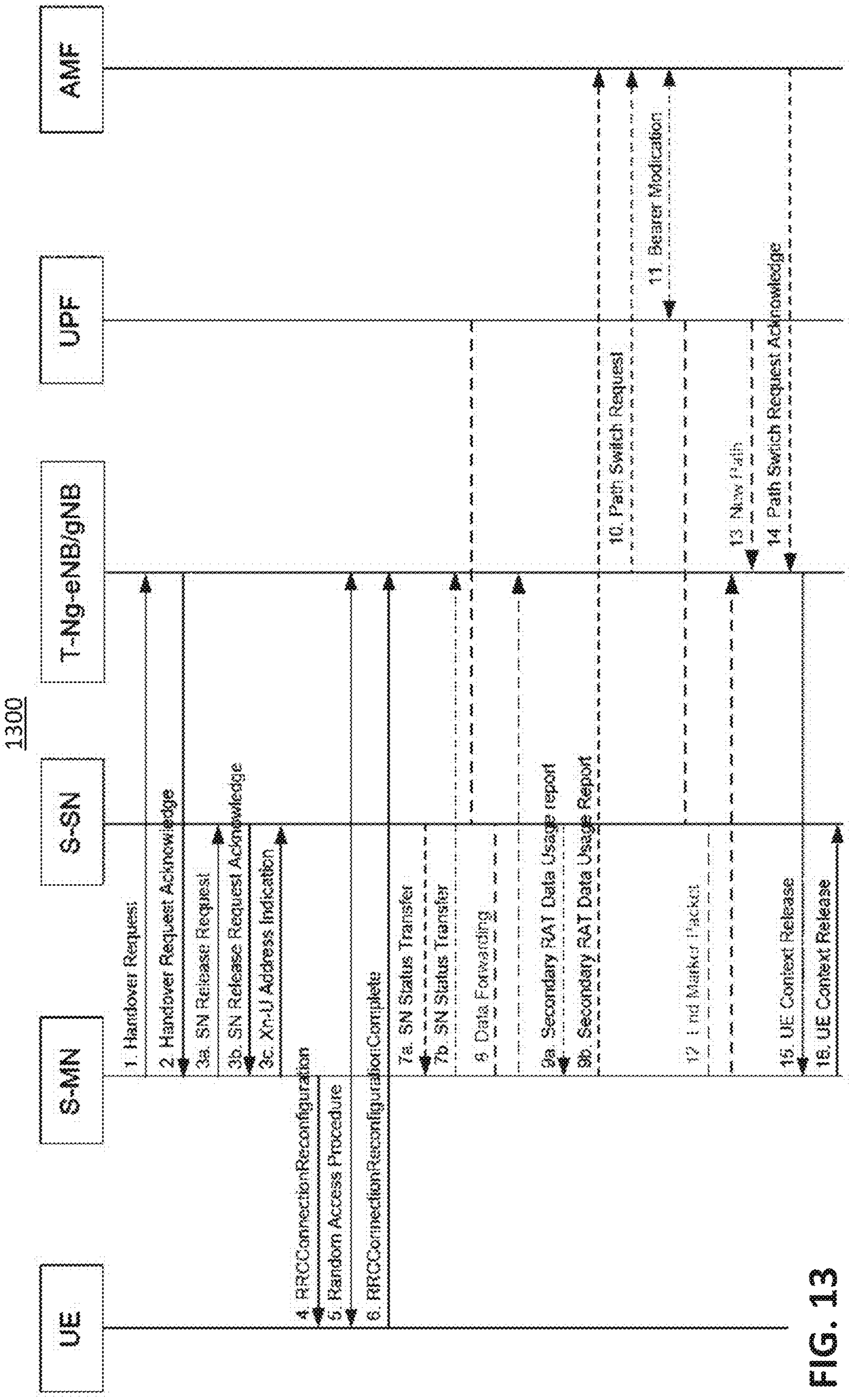
FIG. 13 shows an example signalling flow for an example method for MN to ng-eNB/gNB change.

FIG. 13 shows an example signalling flow for an example method 1300 for MN to ng-eNB/gNB change. According to this example method 1300, in MN to ng-eNB/gNB Change procedure the UE context data from a source MN to a target MN may contain an indication of the mode of operation of the SCG in the UE's current configuration. Concerning the UE context at the SN, that comprises the indication of the SCG mode of operation (e.g. suspended/dormant SCG). The method 1300 includes the following steps, described below.

In step 1, the source MN starts the MN to ng-eNB/gNB Change procedure by initiating the Xn Handover Preparation procedure including both MCG and SCG configuration. In addition, that message may comprise the mode of operation of the SCG e.g. suspended/dormant/deactivated SCG, possibly as part of the SCG configuration, or transmitted outside the RRC container (XnAP message), or transmitted in both the RRC container and in the XnAP Handover Request message.

The source MN may trigger the MN-initiated SN Modification procedure (to the source SN) to retrieve the current SCG configuration and to allow provision of data forwarding related information before step 1. That retrieval may comprise information indicating the SCG mode of operation e.g. indicating whether the SCG is in power saving mode (like SCG suspended/dormant/long DRX), so that the MN can possibly include that information when performing the handover request towards a target MN.

In step 2, as in legacy, the target ng-eNB/gNB includes the field in HO command which releases the SCG configuration, and may also provide forwarding addresses to the source MN.

In step 3*a*/3*b*/3*c*, in legacy, if the resource allocation of target ng-eNB/gNB was successful, the MN initiates the release of the source SN resources towards the source SN including a Cause indicating MCG mobility. The SN acknowledges the release request. If data forwarding is needed, the MN provides data forwarding addresses to the source SN. Reception of the SN Release Request message triggers the source SN to stop providing user data to the UE and, if applicable, to start data forwarding.

However, according to the method, the MN first determines whether steps 3*a*, 3*b*, and 3*c* are to be performed or not, based on the current UE's mode of operation of the SCG.

If the SCG is in a power saving mode of operation (e.g. suspended SCG, dormant SCG, long DRX SCG, etc.) the MN does not perform steps 3*a*, 3*b*, and 3*c*, i.e. even if the resource allocation of target ng-eNB/gNB was successful, the MN does NOT initiate the release of the source SN resources towards the source SN including a Cause indicating MCG mobility; and the MN does NOT provide data forwarding addresses to the source SN.

If the SCG is NOT in a power saving mode of operation (e.g. suspended SCG, dormant SCG, long DRX SCG, etc.) the MN performs steps 3*a*, 3*b*, and 3*c*, i.e. if the resource allocation of target ng-eNB/gNB was successful, the MN initiates the release of the source SN resources towards the source SN including a Cause indicating MCG mobility. The SN acknowledges the release request. If data forwarding is needed, the MN provides data forwarding addresses to the source SN. Reception of the SN Release Request message triggers the source SN to stop providing user data to the UE and, if applicable, to start data forwarding.

In step 4, the MN triggers the UE to perform HO and apply the new configuration. Upon receiving the new configuration, the UE releases the entire SCG configuration. If according to UE's current SCG configuration the SCG mode of operation is in power saving mode (e.g. suspended SCG), some steps do not need to be performed e.g. stop SCG transmissions and suspend the bearers associated with the SCG.

In step 5, the UE synchronizes to the target ng-eNB/gNB. Step 6 comprises a RRCConnectionReconfigurationComplete message from UE to T-Ng-eNB/gNB.

In steps 7*a*/7*b*/8, in legacy, if PDCP termination point is changed for bearers using RLC AM, the SN sends the SN Status Transfer, which the source MN sends then to the target ng-eNB/gNB. And, if applicable, data forwarding takes place from the source side.

However, according to the method, the MN first determines whether steps 7*a*, 7*b* and 8 are to be performed or not, based on the current UE's mode of operation of the SCG.

If the SCG is in a power saving mode of operation (e.g. suspended SCG, dormant SCG, long DRX SCG, etc.) the MN does not perform steps 7*a*, 7*b* and 8.

If the SCG is NOT in a power saving mode of operation (e.g. suspended SCG, dormant SCG, long DRX SCG, etc.) the MN performs steps 7*a*, 7*b*, and 8, i.e., if PDCP termination point is changed for bearers using RLC AM, the SN sends the SN Status Transfer, which the source MN sends then to the target ng-eNB/gNB. And, if applicable, data forwarding takes place from the source side.

eNB/gNB to Master Node Change

Figure 14:
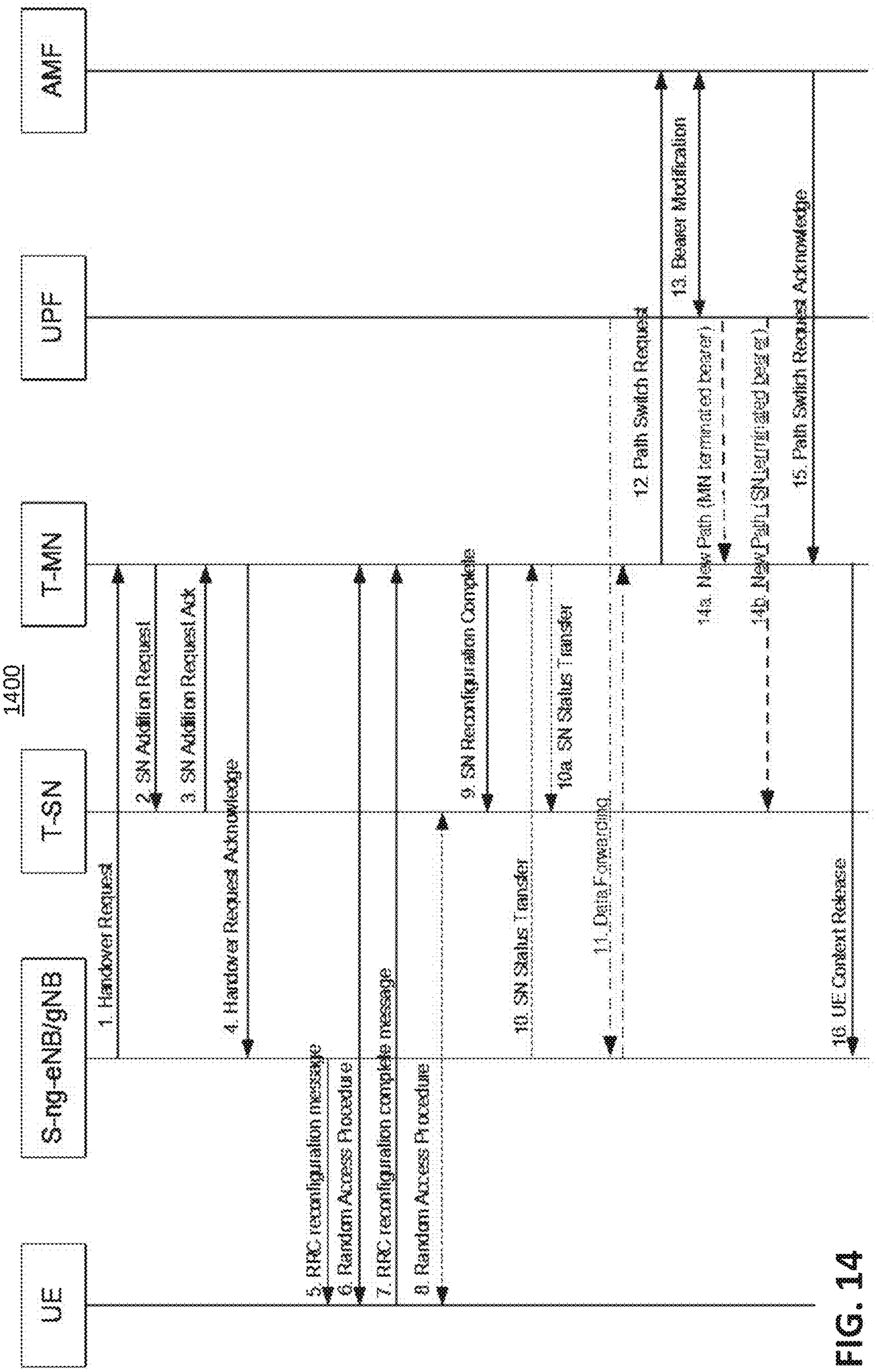
FIG. 14 shows an example signalling flow for an example method for ng-eNB/gNB to MN change.

FIG. 14 shows an example signalling flow for an example method 1400 for ng-eNB/gNB to MN change. The ng-eNB/gNB to MN change procedure is used to transfer UE context data from a source ng-eNB/gNB to a target MN that adds an SN during the handover. Only the cases where the source node and the target MN belong to the same RAT (i.e. they are both ng-eNBs or both gNBs) are supported. Concerning the UE context at the SN, that comprises the indication of the SCG mode of operation (e.g. suspended/dormant SCG). The method 1400 includes the following steps.

In step 1, the source MN starts the handover procedure by initiating the Xn Handover Preparation procedure.

Option b) SN Determines the Mode of Operation of the Target PSCell

In one option, during an Inter-Master Node handover, the target MN decides whether to keep or change the SN (or release the SN); In this case, the MN does not decides/determines the mode of operation for the target SCG (e.g. power saving mode of operation, like suspended SCG), but it is the SN that determines, i.e., the Source SN (in case the MN determines to keep the SN), or the Target SN (in case the MN determines to change the SN).

In step 2, the target MN determines to add an SN. There can be different options regarding which node determines the mode of operation of the SCG after the MCG reconfiguration with sync (MCG mobility with or without MN change):

Option a) Target MN determines the mode of operation of the target PSCell to be added; or Option b) Target SN determines the mode of operation of the target PSCell to be added.

Option a) Target MN Determines the Mode of Operation of the Target PSCell to be Added In one option, the target MN decides to add an SN and in addition, the MN also decides/determines the mode of operation for the target SCG (e.g. power saving mode of operation, like suspended SCG) to be added. Upon that decision/determination, the target MN includes the result of that decision i.e. the mode of operation of the SCG, in the 2. SN Addition Request message to the target SN.

Thanks to that, the target SN may set the SCG mode of operation in the SCG RRC Reconfiguration (to be received by the UE) according to what has been determined by the target MN.

Upon reception of the SN Addition Request message, the target SN sets the SCG mode of operation in the RRC SCG Reconfiguration that the SN generates to be the mode of operation indicated by the MN in the SN Addition Request message (which may be the same or different from the mode of operation in the UE's current configuration/context). Or, a field may be let unsettled in case its absence represents to the UE an indication of a mode of operation determined by the network.

Option b) Target SN Determines the Mode of Operation of the Target PSCell to be Added Upon reception of the SN Addition Request message, the target SN determines the mode of operation of the SCG to be considered by the UE upon the MCG mobility. According to this option, the SN sets the SCG mode of operation in the RRC SCG Reconfiguration that the SN generates to be the mode of operation that it has determined (which may be the same or different from the mode of operation in the UE's current configuration/context).

In step 3, the target SN (T-SN) replies with SN Addition Request Acknowledge. The target SN (T-SN) may include the indication of the full or delta RRC configuration. The message also includes the SCG RRC Reconfiguration that includes the SCG mode of operation e.g. power saving mode of operation as set by the SN (as described in step 2). That may also be called an SN RRC Reconfiguration.

In step 4, the target MN (T-MN) includes within the Handover Request Acknowledge message the MN RRC reconfiguration message to be sent to the UE in order to perform the handover (that including the SN RRC Reconfiguration that includes the indication of the SCG mode of operation e.g. suspended/dormant/deactivated SCG), and may also provide forwarding addresses to the source MN.

Step 5 (and subsequent steps) is similar to step 6 (and subsequent steps) of FIG. 12 described above.

Figure 15:
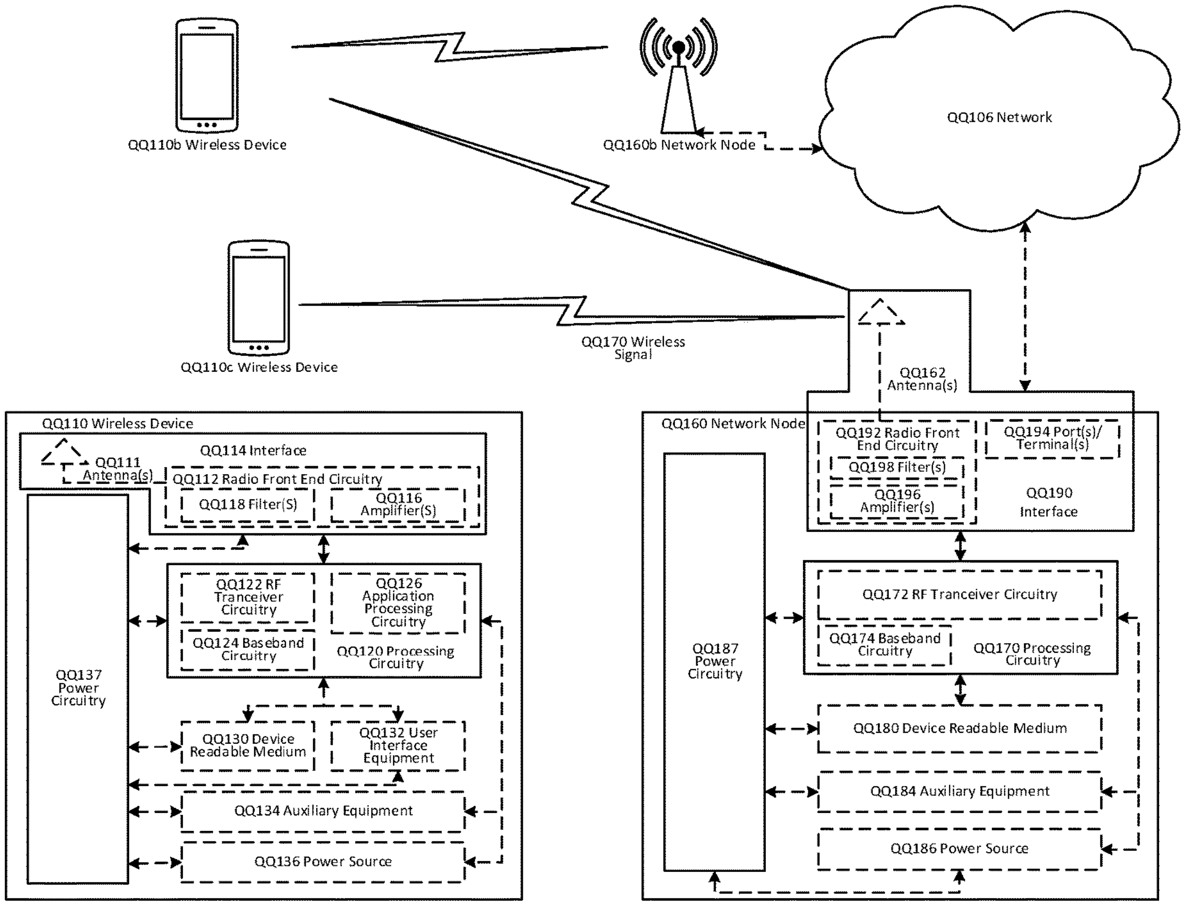
FIG. 15 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules). Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160. Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used. Alternative embodiments of network node QQ160 may include additional components beyond those shown in FIG. 15 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally. Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 16:
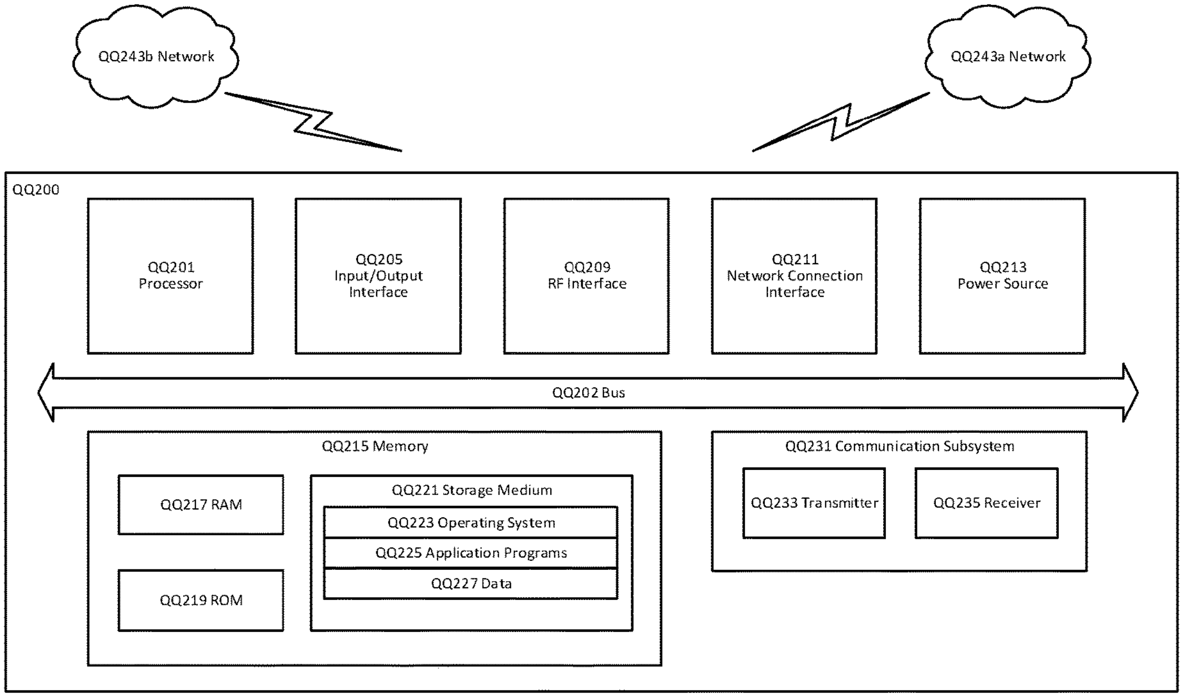
FIG. 16 shows an example of a User Equipment (UE) in accordance with some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 16, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 17:
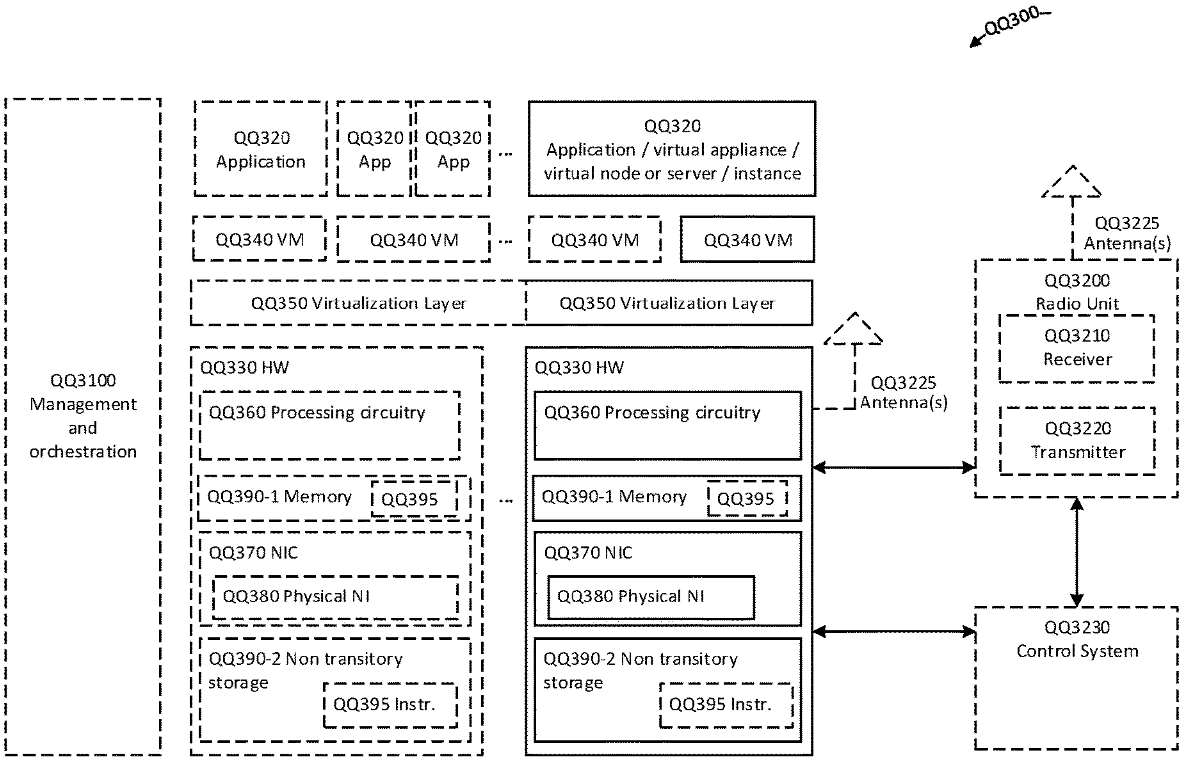
FIG. 17 is a schematic block diagram illustrating a virtualization environment in accordance with some embodiments.

FIG. 17 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized. The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein. Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 17, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 17.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 18:
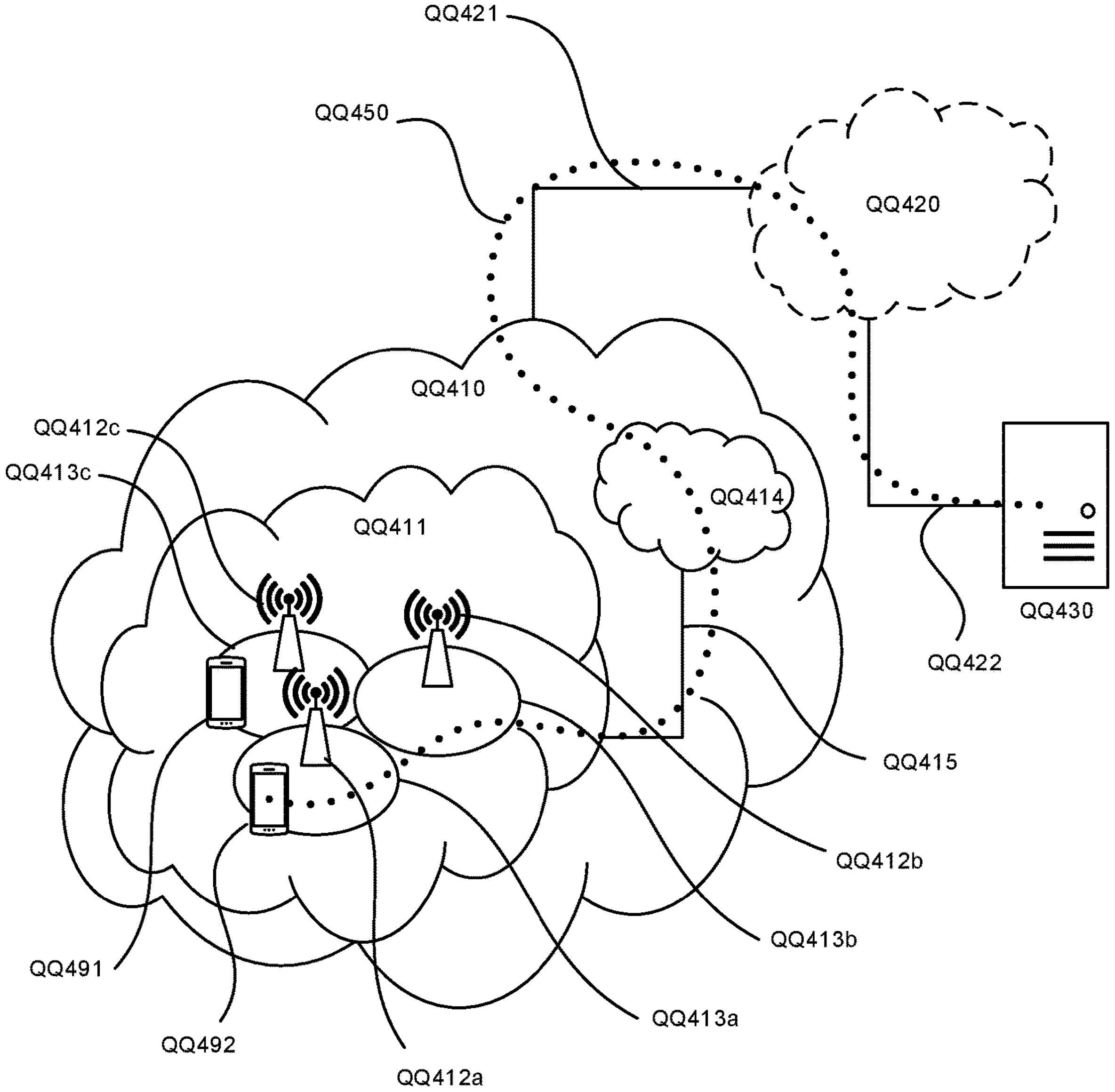
FIG. 18 shows a telecommunication network connected via an intermediate network to a host computer in accordance with some embodiments.

With reference to FIG. 18, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412. Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 18 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 19. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by base station QQ520. Communication interface QQ526 may be configured to facilitate connection QQ560 to host computer QQ510. Connection QQ560 may be direct or it may pass through a core network (not shown in FIG. 19) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 19:
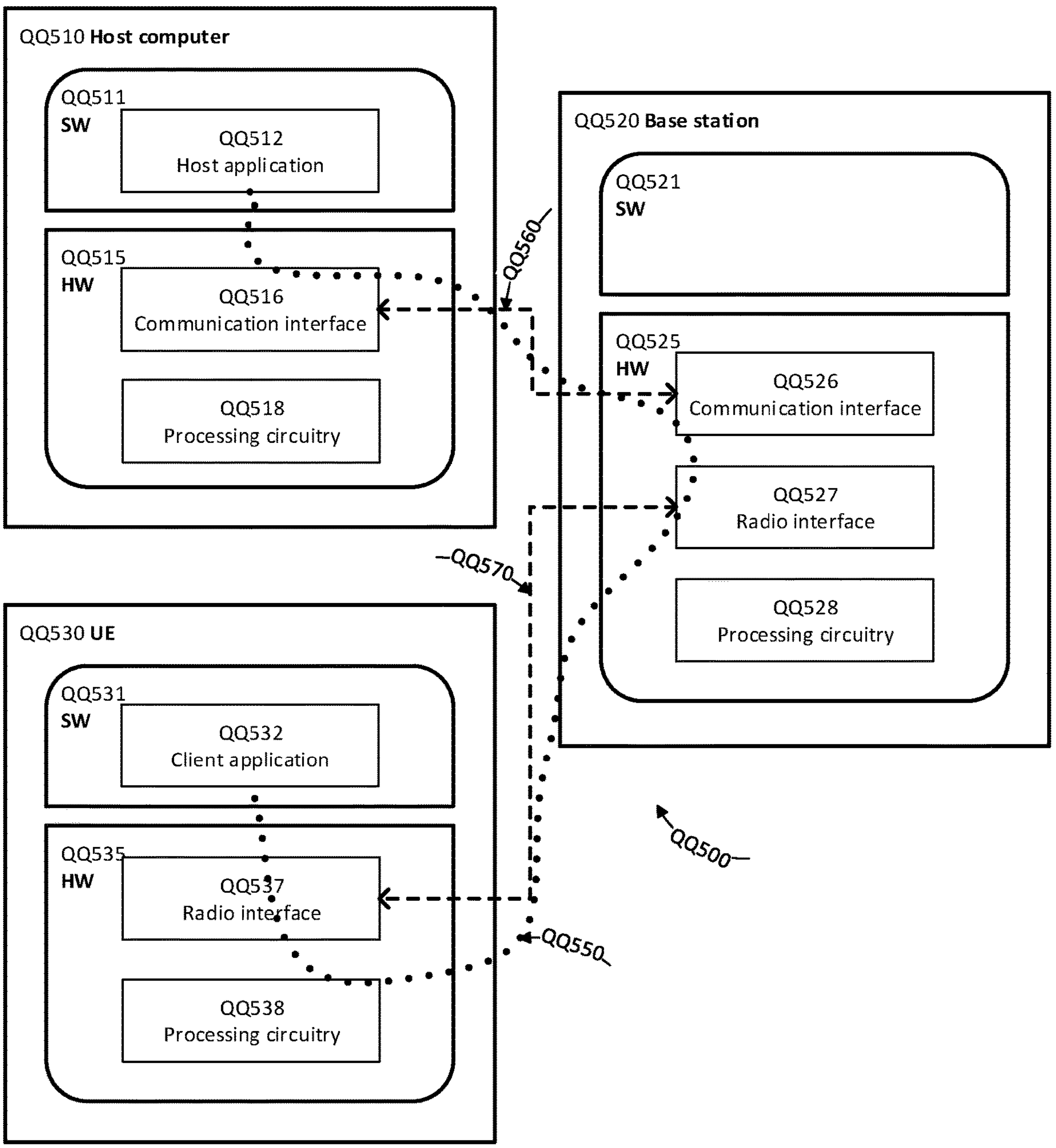
FIG. 19 shows a host computer communicating via a base station with a user equipment over a partially wireless connection in accordance with some embodiments.

It is noted that host computer QQ510, base station QQ520 and UE QQ530 illustrated in FIG. 19 may be similar or identical to host computer QQ430, one of base stations QQ412*a*, QQ412*b*, QQ412*c* and one of UEs QQ491, QQ492 of FIG. 18, respectively. This is to say, the inner workings of these entities may be as shown in FIG. 19 and independently, the surrounding network topology may be that of FIG. 18.

In FIG. 19, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the connection reliability or data rate and thereby provide benefits such as improved connection reliability and/or improved data rate.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 20:
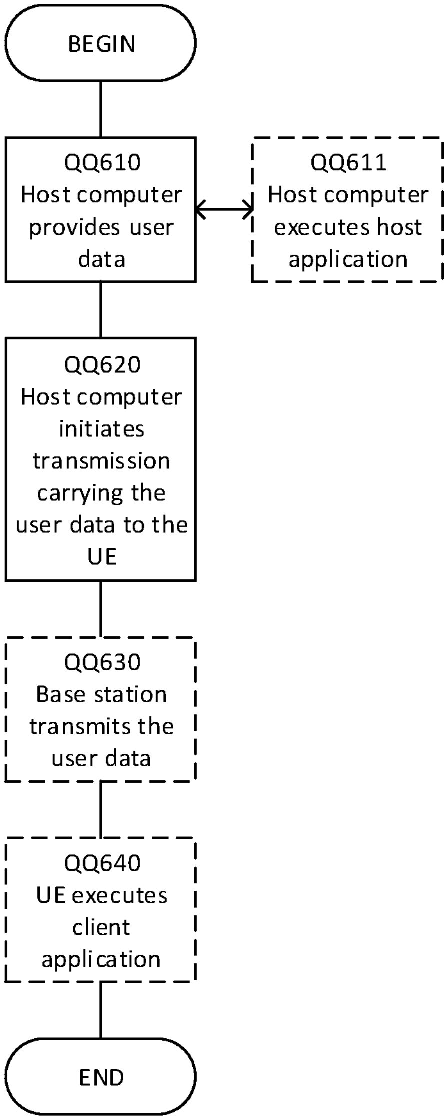
FIG. 20 shows methods implemented in a communication system in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 21:
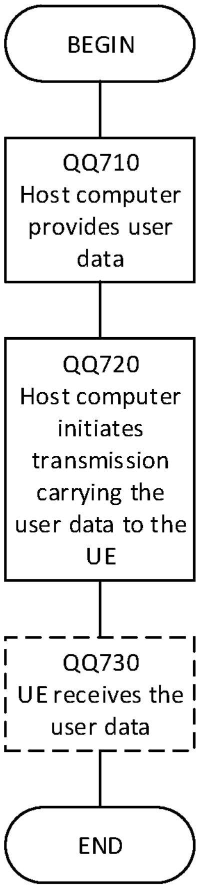
FIG. 21 shows methods implemented in a communication system in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 22:
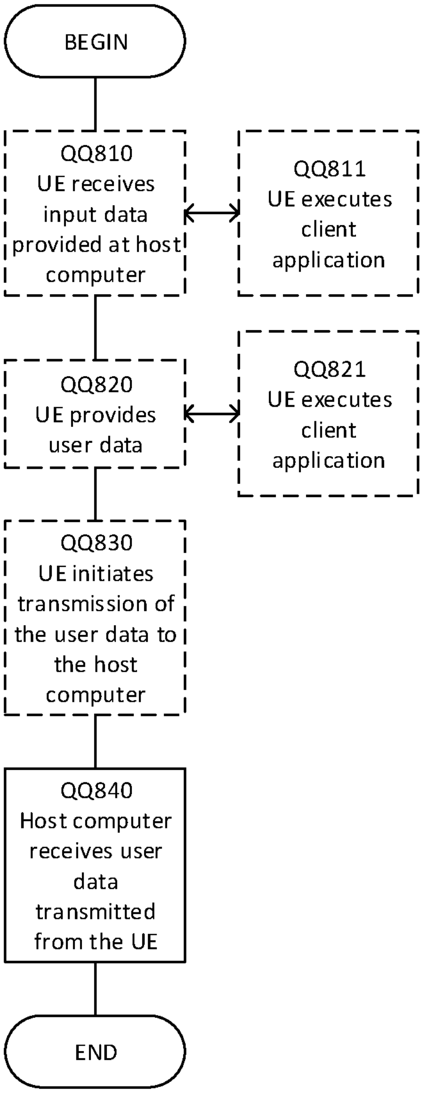
FIG. 22 shows methods implemented in a communication system in accordance with some embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 23:
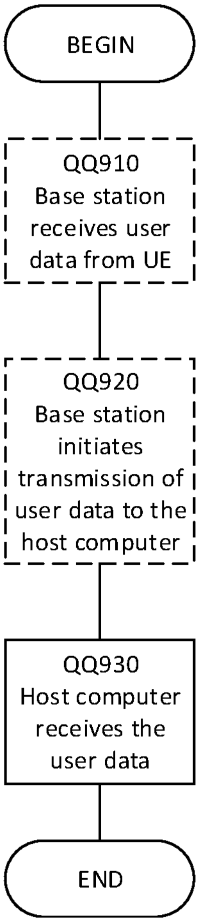
FIG. 23 shows methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 24:
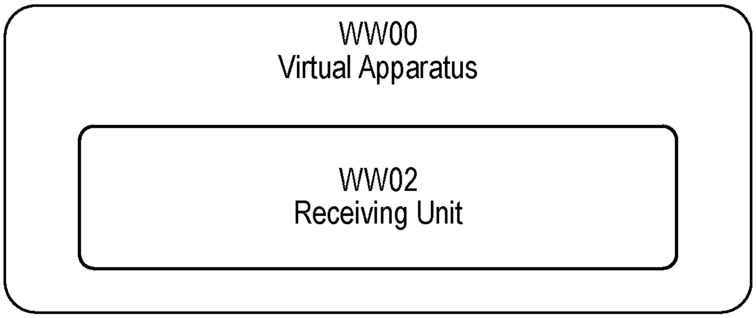
FIG. 24 illustrates a schematic block diagram of virtualization apparatus in accordance with some embodiments.

FIG. 24 illustrates a schematic block diagram of an apparatus WW00 in a wireless network (for example, the wireless network shown in FIG. 15). The apparatus may be implemented in a wireless device or network node (e.g., wireless device QQ110 or network node QQ160 shown in FIG. 15). Apparatus WW00 is operable to carry out the example method described with reference to FIG. 10 and possibly any other processes or methods disclosed herein. It is also to be understood that the method of FIG. 10 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit WW02, and any other suitable units of apparatus WW00 to perform corresponding functions according one or more embodiments of the present disclosure.

As illustrated in FIG. 24, apparatus WW00 includes receiving unit WW02 configured to receive, from a first network node, at least one message in a reconfiguration procedure for a first cell group, wherein the at least one message indicates a mode of operation of the wireless device for a second cell group by the wireless device.

Figure 25:
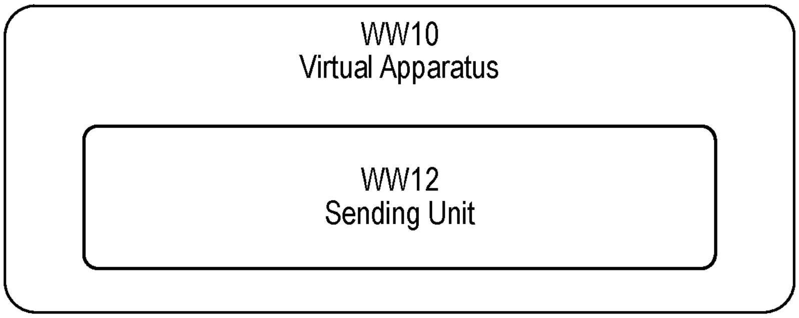
FIG. 25 illustrates a schematic block diagram of virtualization apparatus in accordance with some embodiments.

FIG. 25 illustrates a schematic block diagram of an apparatus WW10 in a wireless network (for example, the wireless network shown in FIG. 15). The apparatus may be implemented in a wireless device or network node (e.g., wireless device QQ110 or network node QQ160 shown in FIG. 15). Apparatus WW10 is operable to carry out the example method described with reference to FIG. 11 and possibly any other processes or methods disclosed herein. It is also to be understood that the method of FIG. 11 is not necessarily carried out solely by apparatus WW10. At least some operations of the method can be performed by one or more other entities.

Virtual Apparatus WW10 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit WW12, and any other suitable units of apparatus WW10 to perform corresponding functions according one or more embodiments of the present disclosure.

As illustrated in FIG. 25, apparatus WW10 includes sending unit WW12 configured to send, to a wireless device, at least one message in a reconfiguration procedure for a first cell group associated with the wireless device, wherein the at least one message indicates a mode of operation of the wireless device for a second cell group.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

The following provides enumerated example embodiments that form part of this disclosure.

Group A Embodiments

1. A method performed by a wireless device for configuring the wireless device with Multi-Radio Access Technology Dual Connectivity (MR-DC), the method comprising:

receiving, from a first network node, at least one message in a reconfiguration procedure for a first cell group;

wherein the at least one message indicates a mode of operation of the wireless device for a second cell group by the wireless device.

2. The method of embodiment 1, wherein the mode of operation of the wireless device for the second cell group comprises a mode of operation of the wireless device for a special cell of the second cell group and/or one or more other cells of the second cell group.

3. The method of embodiment 1 or 2, wherein the mode of operation of the wireless device for the second cell group comprises a power saving mode of operation of the wireless device for the second cell group, a special cell of the second cell group and/or one or more other cells of the second cell group.

4. The method of embodiment 3, wherein the power saving mode comprises a suspend mode or dormant mode of the second cell group, the special cell of the second cell group and/or the one or more other cells of the second cell group.

5. The method of any of embodiments 3 to 4, comprising operating the second cell group according to the power saving mode of operation.

6. The method of embodiment 5, wherein operating the second cell group according to the power saving mode of operation comprises at least one of:

operating a special cell of the second cell group in a dormant mode;

operating the special cell of the second cell group in a suspended mode;

operating the special cell of the second cell group in a dormant bandwidth part (BWP);

stopping monitoring a PDCCH of the special cell and/or at least one other cell of the second cell group;

suspending transmission for data radio bearers (DRBs) associated with the second cell group;

suspending transmission for DRBs associated with a special cell of the second cell group;

suspending transmission for DRBs terminated at a node associated with the second cell group or a special cell and/or at least one other cell of the second cell group;

suspending DRBs associated with the second cell group;

operating the special cell of the second cell group according to discontinuous reception (DRX); and monitoring a PDCCH on the second cell group only during configured on durations of a DRX cycle for the second cell group and/or at least one cell of the second cell group.

7. The method of any of embodiments 3 to 6, comprising storing a configuration associated with the second cell group.

8. The method of embodiment 7, comprising resuming, activating or reactivating the second cell group based on the stored configuration of the second cell group.

9. The method of embodiment 8, comprising resuming, activating or reactivating the second cell group based on the stored configuration of the second cell group in response to a message from the first network node.

10. The method of embodiment 8 or 9, wherein resuming, activating or reactivating the second cell group based on the stored configuration of the second cell group comprises at least one of:

operating a special cell of the second cell group in a normal or active mode;

operating the special cell of the second cell group in a non-dormant bandwidth part (BWP);

starting monitoring a PDCCH of the special cell and/or at least one other cell of the second cell group;

resuming transmission for data radio bearers (DRBs) associated with the second cell group;

resuming transmission for DRBs associated with a special cell of the second cell group;

resuming transmission for DRBs terminated at a node associated with the second cell group or a special cell and/or at least one other cell of the second cell group;

resuming DRBs associated with the second cell group; and exiting discontinuous reception (DRX) of the special cell of the second cell group.

11. The method of any of embodiment 2, wherein the mode of operation of the wireless device for the second cell group comprises a resumed, normal, legacy or active mode.

12. The method of any of embodiments 1 to 11, comprising operating the second cell group according to the mode of operation indicated in the at least one message.

13. The method of any of embodiments 1 to 12, wherein the mode of operation of the wireless device for a second cell group by the wireless device comprises a mode of operation of the wireless device for a special cell associated with the second cell group by the wireless device.

14. The method of any of embodiments 1 to 13, wherein the reconfiguration procedure for the first cell group comprises a change of a special cell for the first cell group, a change of at least one other cell for the first cell group, a handover, a reconfiguration with sync of the first cell group and/or a mobility procedure for the wireless device.

15. The method of any of embodiments 1 to 14, wherein the at least one message includes an indication of a reconfiguration procedure for the second cell group.

16. The method of embodiment 15, comprising applying the reconfiguration procedure for the second cell group in response to a resume or activation command from the first network node.

17. The method of embodiment 15 or 16, wherein the reconfiguration procedure for the second cell group comprises a change of a special cell for the second cell group, a change of at least one other cell for the second cell group, a handover, a reconfiguration with sync of the second cell group and/or a mobility procedure for the wireless device.

18. The method of any of embodiments 1 to 17, comprising performing the reconfiguration procedure for the first cell group.

19. The method of any of embodiments 1 to 18, wherein the at least one message comprises at least one RRC message and/or at least one RRC reconfiguration message.

20. The method of any of embodiments 1 to 19, wherein the first cell group comprises a master cell group (MCG) and the second cell group comprises a secondary cell group (SCG).

21. The method of any of embodiments 1 to 20, wherein the second cell group comprises a master cell group (MCG) and the first cell group comprises a secondary cell group (SCG).

22. The method of any of embodiments 1 to 21, wherein the wireless device comprises a User Equipment (UE).

23. The method of any of embodiments 1 to 22, wherein the first network node comprises a base station, base station-control unit (CU), base station-distributed unit (DU), eNB, eNB-CU, eNB-DU, gNB, gNB-CU or gNB-DU.

24. The method of any of the previous embodiments, further comprising:
- providing user data; and
- forwarding the user data to a host computer via the transmission to the base station.

Group B Embodiments

25. A method performed by a first network node for configuring a wireless device with Multi-Radio Access Technology Dual Connectivity (MR-DC), the method comprising:
- sending, to the wireless device, at least one message in a reconfiguration procedure for a first cell group associated with the wireless device;
- wherein the at least one message indicates a mode of operation of the wireless device for a second cell group.

26. The method of embodiment 25, wherein the mode of operation of the wireless device for the second cell group comprises a mode of operation of the wireless device for a special cell of the second cell group and/or one or more other cells of the second cell group.

27. The method of embodiment 25 or 26, wherein the mode of operation of the wireless device for the second cell group comprises a power saving mode of operation of the wireless device for the second cell group, a special cell of the second cell group and/or one or more other cells of the second cell group.

28. The method of embodiment 27, wherein the power saving mode comprises a suspend mode or dormant mode of the second cell group, the special cell of the second cell group and/or the one or more other cells of the second cell group.

29. The method of any of embodiment 27 or 28, comprising sending at least one further message to the wireless device to cause the wireless device to resume, activate or reactivate the second cell group based on a stored configuration of the second cell group at the wireless device.

30. The method of any of embodiments 27 to 29, comprising stopping transmitting a PDCCH to the wireless device on a special cell associated with the second cell group and/or at least one other cell associated with the second cell group.

31. The method of any of embodiment 26, wherein the mode of operation of the wireless device for the second cell group comprises a resumed, normal, legacy or active mode.

32. The method of any of embodiments 25 to 31, wherein the reconfiguration procedure for the first cell group comprises a change of a special cell for the first cell group, a change of at least one other cell for the first cell group, a handover, a reconfiguration with sync of the first cell group and/or a mobility procedure for the wireless device.

33. The method of any of embodiments 25 to 32, wherein the at least one message includes an indication of a reconfiguration procedure for the second cell group.

34. The method of embodiment 33, comprising sending a resume or activation command to the wireless device to cause the wireless device to apply the reconfiguration procedure for the second cell group.

35. The method of embodiment 32 or 34, wherein the reconfiguration procedure for the second cell group comprises a change of a special cell for the second cell group, a change of at least one other cell for the second cell group, a handover, a reconfiguration with sync of the second cell group and/or a mobility procedure for the wireless device.

36. The method of any of embodiments 25 to 35, comprising receiving an indication of the mode of operation of the wireless device for a second cell group from a network node associated with the second cell group before sending the at least one message to the wireless device.

37. The method of any of embodiments 25 to 35, comprising sending an indication of the mode of operation of the wireless device for a second cell group to a network node associated with the second cell group.

38. The method of any of embodiments 25 to 37, comprising sending context information of the wireless device to a node associated with the first cell group reconfigured according to the reconfiguration procedure.

39. The method of any of embodiments 25 to 38, wherein the at least one message comprises at least one RRC message and/or at least one RRC reconfiguration message.

40. The method of any of embodiments 25 to 39, wherein the first cell group comprises a master cell group (MCG) and the second cell group comprises a secondary cell group (SCG).

41. The method of any of embodiments 25 to 40, wherein the second cell group comprises a master cell group (MCG) and the first cell group comprises a secondary cell group (SCG).

42. The method of any of embodiments 25 to 41, wherein the wireless device comprises a User Equipment (UE).

43. The method of any of embodiments 25 to 42, wherein the first network node comprises a base station, base station-control unit (CU), base station-distributed unit (DU), eNB, eNB-CU, eNB-DU, gNB, gNB-CU or gNB-DU.

44. The method of any of embodiments 25 to 43, wherein the first network node is associated with a special cell (SpCell) of the first cell group.

45. The method of any of the previous embodiments, further comprising:
- obtaining user data; and
- forwarding the user data to a host computer or a wireless device.

Group C Embodiments

46. A wireless device for configuring a wireless device with Multi-Radio Access Technology Dual Connectivity (MR-DC), the wireless device comprising:
- processing circuitry configured to perform any of the steps of any of the Group A embodiments; and
- power supply circuitry configured to supply power to the wireless device.

47. A base station for configuring a wireless device with Multi-Radio Access Technology Dual Connectivity (MR-DC), the base station comprising:
- processing circuitry configured to perform any of the steps of any of the Group B embodiments;
- power supply circuitry configured to supply power to the base station.

48. A user equipment (UE) for configuring a wireless device with Multi-Radio Access Technology Dual Connectivity (MR-DC), the UE comprising:
- an antenna configured to send and receive wireless signals;
- radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

49. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

50. The communication system of the previous embodiment further including the base station.

51. The communication system of the previous 2 embodiments, further including the UE, wherein the UE is configured to communicate with the base station.

52. The communication system of the previous 3 embodiments, wherein:

the processing circuitry of the host computer is configured to execute a host application, thereby providing the user data; and the UE comprises processing circuitry configured to execute a client application associated with the host application.

53. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

54. The method of the previous embodiment, further comprising, at the base station, transmitting the user data.

55. The method of the previous 2 embodiments, wherein the user data is provided at the host computer by executing a host application, the method further comprising, at the UE, executing a client application associated with the host application.

56. A user equipment (UE) configured to communicate with a base station, the UE comprising a radio interface and processing circuitry configured to performs the of the previous 3 embodiments.

57. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

58. The communication system of the previous embodiment, wherein the cellular network further includes a base station configured to communicate with the UE.

59. The communication system of the previous 2 embodiments, wherein:

the processing circuitry of the host computer is configured to execute a host application, thereby providing the user data; and the UE's processing circuitry is configured to execute a client application associated with the host application.

60. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

61. The method of the previous embodiment, further comprising at the UE, receiving the user data from the base station.

62. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

63. The communication system of the previous embodiment, further including the UE.

64. The communication system of the previous 2 embodiments, further including the base station, wherein the base station comprises a radio interface configured to communicate with the UE and a communication interface configured to forward to the host computer the user data carried by a transmission from the UE to the base station.

65. The communication system of the previous 3 embodiments, wherein:

the processing circuitry of the host computer is configured to execute a host application; and the UE's processing circuitry is configured to execute a client application associated with the host application, thereby providing the user data.

66. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

67. A method implemented in a communication system including a host computer, a base station and a user equipment (UE), the method comprising:

at the host computer, receiving user data transmitted to the base station from the UE, wherein the UE performs any of the steps of any of the Group A embodiments.

68. The method of the previous embodiment, further comprising, at the UE, providing the user data to the base station.

69. The method of the previous 2 embodiments, further comprising:

at the UE, executing a client application, thereby providing the user data to be transmitted; and at the host computer, executing a host application associated with the client application.

70. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

71. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

72. The communication system of the previous embodiment further including the base station.

73. The communication system of the previous 2 embodiments, further including the UE, wherein the UE is configured to communicate with the base station.

74. The communication system of the previous 3 embodiments, wherein:

the processing circuitry of the host computer is configured to execute a host application;

the UE is configured to execute a client application associated with the host application, thereby providing the user data to be received by the host computer.

75. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

76. The method of the previous embodiment, further comprising at the base station, receiving the user data from the UE.

77. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device configured with Multi-Radio Access Technology Dual Connectivity (MR-DC), the method comprising:

receiving, from a first network node, at least one message in a reconfiguration procedure for a first cell group, wherein the at least one message indicates a power saving mode of operation to be applied by the wireless device for a second cell group, wherein the power saving mode comprises a suspended mode or dormant mode or deactivated mode or inactivated mode of operation, wherein the reconfiguration procedure for the first cell group is a mobility procedure for the wireless device, said mobility procedure comprising one or more of: a change of a special cell for the first cell group, a change of at least one other cell for the first cell group, a handover, and a reconfiguration with sync of the first cell group; and operating the second cell group according to the power saving mode of operation indicated in the at least one message.

2. The method of claim 1, wherein the power saving mode of operation to be applied by the wireless device for the second cell group comprises a mode of operation of the wireless device for a special cell of the second cell group and/or one or more other cells of the second cell group.

3. The method of claim 1, wherein operating the second cell group according to the power saving mode of operation comprises at least one of:

operating a special cell of the second cell group in the dormant mode;

operating the special cell of the second cell group in the suspended mode;

operating the special cell of the second cell group in the deactivated mode;

operating the special cell of the second cell group in the inactivated mode;

operating the special cell of the second cell group in a dormant bandwidth part (BWP);

stopping monitoring a Physical Downlink Control Channel (PDCCH) of the special cell and/or at least one other cell of the second cell group;

suspending transmission for data radio bearers (DRBs) associated with the second cell group;

suspending transmission for DRBs associated with a special cell of the second cell group;

suspending transmission for DRBs terminated at a node associated with the second cell group or a special cell and/or at least one other cell of the second cell group;

suspending DRBs associated with the second cell group;

operating the special cell of the second cell group according to discontinuous reception (DRX); and monitoring a PDCCH on the second cell group only during configured on-durations of a DRX cycle for the second cell group and/or at least one cell of the second cell group.

4. The method of claim 1, further comprising storing a configuration associated with the second cell group, and resuming, activating or reactivating the second cell group based on the stored configuration of the second cell group.

5. The method of claim 4, wherein resuming, activating or reactivating the second cell group based on the stored configuration of the second cell group comprises at least one of:

operating a special cell of the second cell group in a normal or active mode;

operating the special cell of the second cell group in a non-dormant bandwidth part (BWP);

starting monitoring a PDCCH of the special cell and/or at least one other cell of the second cell group;

resuming transmission for data radio bearers (DRBs) associated with the second cell group;

resuming transmission for DRBs associated with a special cell of the second cell group;

resuming transmission for DRBs terminated at a node associated with the second cell group or a special cell and/or at least one other cell of the second cell group;

resuming DRBs associated with the second cell group; and exiting discontinuous reception (DRX) of the special cell of the second cell group.

6. The method of any claim 1, wherein the at least one message includes an indication of a reconfiguration procedure for the second cell group.

7. The method of claim 6, wherein the reconfiguration procedure for the second cell group comprises a change of a special cell for the second cell group, a change of at least one other cell for the second cell group, a handover, a reconfiguration with sync of the second cell group, and/or a mobility procedure for the wireless device.

8. The method of claim 1, further comprising performing the reconfiguration procedure for the first cell group.

9. The method of claim 1, wherein the at least one message comprises at least one Radio Resource Control (RRC) message and/or at least one RRC reconfiguration message.

10. The method of claim 1, wherein:

the first cell group comprises a master cell group (MCG) and the second cell group comprises a secondary cell group (SCG); or the second cell group comprises a master cell group (MCG) and the first cell group comprises a secondary cell group (SCG).

11. The method of claim 1, wherein the wireless device comprises a User Equipment (UE), and/or the first network node comprises a base station, base station-control unit (CU), base station-distributed unit (DU), eNB, eNB-CU, eNB-DU, gNB, gNB-CU or gNB-DU.

12. A method performed by a first network node for configuring a wireless device configured with Multi-Radio Access Technology Dual Connectivity (MR-DC), the method comprising:

sending, to the wireless device, at least one message in a reconfiguration procedure for a first cell group associated with the wireless device, wherein the reconfiguration procedure for the first cell group is a mobility procedure for the wireless device, said mobility procedure comprising one or more of: a change of a special cell for the first cell group, a change of at least one other cell for the first cell group, a handover, and a reconfiguration with sync of the first cell group;

wherein the at least one message indicates a power saving mode of operation of the wireless device for a second cell group, wherein the power saving mode comprises a suspended mode or dormant mode or deactivated mode or inactivated mode of operation.

13. The method of claim 12, wherein the power saving mode of operation to be applied by the wireless device for the second cell group comprises a mode of operation of the wireless device for a special cell of the second cell group and/or one or more other cells of the second cell group.

14. The method of claim 12, further comprising sending at least one further message to the wireless device to cause the wireless device to resume, activate or reactivate the second cell group based on a stored configuration of the second cell group at the wireless device.

15. The method of claim 12, further comprising stopping transmitting a PDCCH to the wireless device on a special cell associated with the second cell group and/or at least one other cell associated with the second cell group, wherein a mode of operation of the wireless device for the second cell group comprises a resumed, normal, legacy or active mode.

16. The method of claim 12, wherein the at least one message includes an indication of a reconfiguration procedure for the second cell group.

17. The method of claim 16, wherein the reconfiguration procedure for the second cell group comprises a change of a special cell for the second cell group, a change of at least one other cell for the second cell group, a handover, a reconfiguration with sync of the second cell group, and/or a mobility procedure for the wireless device.

18. The method of claim 12, further comprising:

receiving an indication of a mode of operation of the wireless device for the second cell group from a network node associated with the second cell group before sending the at least one message to the wireless device; and/or sending an indication of a mode of operation of the wireless device for the second cell group to a network node associated with the second cell group; and/or sending context information of the wireless device to a node associated with the first cell group reconfigured according to the reconfiguration procedure.

19. The method of claim 12, wherein the at least one message comprises at least one RRC message and/or at least one RRC reconfiguration message.

20. The method of claim 12, wherein the first cell group comprises a master cell group (MCG) and the second cell group comprises a secondary cell group (SCG), or the second cell group comprises a master cell group (MCG) and the first cell group comprises a secondary cell group (SCG).

21. The method of claim 12, wherein the wireless device comprises a User Equipment (UE), and/or the first network node comprises a base station, base station-control unit (CU), base station-distributed unit (DU), eNB, eNB-CU, eNB-DU, gNB, gNB-CU or gNB-DU.

22. The method of claim 12, wherein the first network node is associated with a special cell (SpCell) of the first cell group.

23. A wireless device configured with Multi-Radio Access Technology Dual Connectivity (MR-DC), the wireless device comprising a processor and a memory, the memory containing instructions executable by the processor such that the wireless device is operable to:

receive, from a first network node, at least one message in a reconfiguration procedure for a first cell group, wherein the at least one message indicates a power saving mode of operation to be applied by the wireless device for a second cell group, wherein the power saving mode comprises a suspended mode or dormant mode or deactivated mode or inactivated mode of operation, wherein the reconfiguration procedure for the first cell group is a mobility procedure for the wireless device, said mobility procedure comprising one or more of: a change of a special cell for the first cell group, a change of at least one other cell for the first cell group, a handover, and a reconfiguration with sync of the first cell group; and operate the second cell group according to the power saving mode of operation indicated in the at least one message.

24. The wireless device of claim 23, wherein the power saving mode of operation to be applied by the wireless device for the second cell group comprises a mode of operation of the wireless device for a special cell of the second cell group and/or one or more other cells of the second cell group.

25. The wireless device of claim 23, wherein the memory contains instructions executable by the processor such that the wireless device is operable to operate the second cell group according to the power saving mode of operation by at least one of:

operating a special cell of the second cell group in the dormant mode;

operating the special cell of the second cell group in the suspended mode;

operating the special cell of the second cell group in the deactivated mode;

operating the special cell of the second cell group in the inactivated mode;

operating the special cell of the second cell group in a dormant bandwidth part (BWP);

stopping monitoring a Physical Downlink Control Channel (PDCCH) of the special cell and/or at least one other cell of the second cell group;

suspending transmission for data radio bearers (DRBs) associated with the second cell group;

suspending transmission for DRBs associated with a special cell of the second cell group;

suspending transmission for DRBs terminated at a node associated with the second cell group or a special cell and/or at least one other cell of the second cell group;

suspending DRBs associated with the second cell group;

operating the special cell of the second cell group according to discontinuous reception (DRX); and monitoring a PDCCH on the second cell group only during configured on-durations of a DRX cycle for the second cell group and/or at least one cell of the second cell group.

26. A first network node for configuring a wireless device configured with Multi-Radio Access Technology Dual Connectivity (MR-DC), the first network node comprising a processor and a memory, the memory containing instructions executable by the processor such that the first network node is operable to:

send, to the wireless device, at least one message in a reconfiguration procedure for a first cell group associated with the wireless device, wherein the reconfiguration procedure for the first cell group is a mobility procedure for the wireless device, said mobility procedure comprising one or more of: a change of a special cell for the first cell group, a change of at least one other cell for the first cell group, a handover and a reconfiguration with sync of the first cell group;

wherein the at least one message indicates a power saving mode of operation of the wireless device for a second cell group, wherein the power saving mode comprises a suspend mode or dormant mode or deactivated mode or inactivated mode of operation.

* * * * *